(12) United States Patent
Zetts

(10) Patent No.: US 6,378,129 B1
(45) Date of Patent: Apr. 23, 2002

(54) VIDEO SERVER CONTENT SYNCHRONIZATION

(75) Inventor: John Mark Zetts, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,169

(22) Filed: Mar. 30, 1998

(51) Int. Cl.[7] .......................... H04N 7/173; H04N 7/16; G06F 15/16; H02H 3/05; H03K 19/003
(52) U.S. Cl. .......................... 725/94; 725/116; 725/138; 725/146; 714/6; 709/248
(58) Field of Search ............................... 725/91, 93, 94, 725/97, 116, 144, 138, 146; 714/6, 10, 11, 12, 775, 779; 709/219, 248, 250

(56) References Cited

U.S. PATENT DOCUMENTS

| | | | |
|---|---|---|---|
| 5,414,455 A | | 5/1995 | Hooper et al. |
| 5,426,774 A | | 6/1995 | Banerjee et al. |
| 5,442,389 A | | 8/1995 | Blahut et al. |
| 5,513,314 A | * | 4/1996 | Kandasamy et al. ........... 714/6 |
| 5,583,561 A | | 12/1996 | Baker et al. |
| 5,592,626 A | | 1/1997 | Papadimitriou et al. |
| 5,870,553 A | * | 2/1999 | Shaw et al. .................. 709/219 |
| 6,085,253 A | * | 7/2000 | Blackwell et al. .......... 709/235 |

* cited by examiner

*Primary Examiner*—Andrew Faile
*Assistant Examiner*—Andrew Y. Koenig
(74) *Attorney, Agent, or Firm*—Robert V. Wilder; Leslie A. Vanleeuwen

(57) ABSTRACT

Primary and secondary servers are coupled together for furnishing a backed-up video streaming function for outputting a series of video content presentations to a user group. The primary server functions as the primary provider of the video files and the secondary server is arranged to operate as a "hot stand-by" to back-up the primary server. In the event the primary server is disabled, the secondary server takes over for the primary server in furnishing video content in accordance with a common playlist. When the secondary server goes down for any reason, the illustrated methodology effectively re-synchronizes the video content and the video stream of the secondary server with that of the primary server such that the secondary server is enabled to resume the back-up function without interruption of the video file streaming process being carried on by the primary server. Various program routines and sample screen displays are illustrated in an exemplary embodiment of the back-up dual server video streaming system and methodology.

37 Claims, 23 Drawing Sheets

SERVER1 PLAYLIST 200

| ENTRY | DEVICE | STATUS | TIME | VIDEO | TITLE | DURATION |
|---|---|---|---|---|---|---|
| 23 | Server 1 | Complete | 11:10:50:00 | ABC078 | ABC promo | 00:05:00:00 |
| 24 | Server 1 | Complete | 11:15:50:00 | FORD9EE | FORD ad | 00:00:30:00 |
| 25 | Server 1 | Play | 11:16:20:00 | MAC478 | McDonald's | 00:00:45:00 |
| 26 | Server 1 | Queued | 11:17:05:00 | WYENF | Local promo | 00:00:15:00 |
| 27 | Server 1 | | 11:17:20:00 | HC00001 | Hard Copy | 00:12:15:00 |
| 28 | Server 1 | | 11:29:35:00 | A9DEE | GM ad | 00:01:00:00 |
| 29 | Server 1 | Staging | 11:30:35:00 | HC00002 | Hard Copy | 00:07:18:00 |
| 30 | Server 1 | | 11:37:53:00 | PUB12 | Pub Serv Ann | 00:00:20:00 |

SERVER2 PLAYLIST 210

| ENTRY | DEVICE | STATUS | TIME | VIDEO | TITLE | DURATION |
|---|---|---|---|---|---|---|
| 23 | Server 2 | Complete | 11:10:50:00 | ABC078 | ABC promo | 00:05:00:00 |
| 24 | Server 2 | Complete | 11:15:50:00 | FORD9EE | FORD ad | 00:00:30:00 |
| 25 | Server 2 | Play | 11:16:20:00 | MAC478 | McDonald's | 00:00:45:00 |
| 26 | Server 2 | Queued | 11:17:05:00 | WYENF | Local promo | 00:00:15:00 |
| 27 | Server 2 | | 11:17:20:00 | HC00001 | Hard Copy | 00:12:15:00 |
| 28 | Server 2 | | 11:29:35:00 | A9DEE | GM ad | 00:01:00:00 |
| 29 | Server 2 | Staging | 11:30:35:00 | HC00002 | Hard Copy | 00:07:18:00 |
| 30 | Server 2 | | 11:37:53:00 | PUB12 | Pub Serv Ann | 00:00:20:00 |

*FIG. 2*

| | RESYNC WORK QUEUE | | | | | | |
|---|---|---|---|---|---|---|---|
| | 505 RESYNC STATUS: | JOBS QUEUED | | 510 CURRENT JOB ID: | | NONE | |
| | Resync Jobs For Server2 | | | | | | |
| 520 Job | 521 Name | 522 Action | 523 Size | 524 Date | 525 Time | 526 Priority | 527 Status |
| 4 | nbrazil | Stage | 45498762 | 3-11-1997 | 2:07:01 PM | Max | Waiting in Q |
| 5 | njapan | Stage | 31093778 | 3-11-1997 | 2:07:01 PM | High | Waiting in Q |
| 1 | opti15a | Delete | 114589278 | 3-11-1997 | 2:06:50 PM | | Waiting in Q |
| 2 | vela2 | Delete | 15658108 | 3-11-1997 | 2:06:50 PM | | Job Held |
| 3 | vela3 | Delete | 15658108 | 3-11-1997 | 2:06:50 PM | | Waiting in Q |
| 6 | Nmodels | Stage | 31492394 | 3-11-1997 | 2:07:01 PM | Max | Job Held |
| 7 | opti15 | Stage | 114589276 | 3-11-1997 | 2:07:01 PM | Low | Waiting in Q |

START RESYNC
SUSPEND RESYNC
CANCEL RESYNC

CANCEL    HELP

FIG. 5

SET RESYNC STAGE PRIOITY

Default resync stage prioity
- ● Max (Best Effort)
- ○ High
- ○ Medium
- ○ Low

UNDO   DEFAULT

Staging priority bandwidth Settings

High priority    7500000    Bytes/sec
Medium priority  4500000    Bytes/sec
Low priority     1500000    Bytes/sec

UNDO   DEFAULT

Resync stage priority when archive staging is active
● Reduce prioity when archive staging is active
Reduced priority   4500000   Bytes/sec

UNDO   DEFAULT

CANCEL    SAVE    HELP

FIG. 6

VIDEO SERVER CONTENT SYNCHRONIZATION

RELATED APPLICATIONS

The present application is related to co-pending application entitled "VIDEO SERVER STREAMING SYNCHRONIZATION", Ser. No. 09/050168 filed on even date herewith and assigned to the assignee of the present application. Subject matter disclosed and not claimed herein is disclosed and claimed in the related application.

FIELD OF THE INVENTION

The present invention relates generally to information processing systems and more particularly to video data transmission systems.

BACKGROUND OF THE INVENTION

Television broadcasters, as well as cable system and network operators, including Internet servers, and other video delivery systems which use video servers to store and play out digital video signals, have very stringent requirements for reliability since in most cases video stream interrupts cannot be tolerated. To meet such reliability standards, video servers are often employed in pairs where one of the servers serves as a "hot standby" in case the primary video server experiences a failure.

Video servers typically store large amounts of video (also referred to as "video content" or "content") on DASD (direct access storage devices), and when configured redundantly, the primary and secondary systems have the exact same video content. In addition, both servers ideally will play identical video out of respective video ports, although only the output of the primary server actually gets broadcast. In this manner, the secondary server may function in a standby mode and can be switched "on-line" immediately.

Although video servers may store many hours of high quality video content, in practice, a cable company or a television studio must continuously delete old videos from the servers and copy or stage in new videos that are scheduled to play in the near future. That practice is called "content management" and it is an automated process that takes place concurrently while videos are being played. When new videos are staged, they are staged to both the primary and the secondary servers simultaneously so that the two servers continue to be "mirror images" of each other.

If the secondary server shuts down due to scheduled or unscheduled maintenance for any length of time, its DASD may no longer be a mirror image of the primary server because the server was "off-line" while content was being deleted from or staged to the primary server. Because of this, the secondary server's ability to function as a "hot standby" is degraded and the server administrator must manually restore the missing content and delete the extraneous videos. In the worst case, videos that are currently played or queued may be missing from the secondary server which means that one or more channels would be off the air if a server "switch" were needed and this would result in a loss of revenue.

When the content of the redundant or secondary server is no longer in synch with the primary server, the server administrator must first determine which videos are needed soonest and stage those videos in as soon as possible. In order to make room for the new content, the administrator may first need to delete some "unneeded" content. For example, one or more of the videos may have played on the primary server while the secondary server was out of service and those videos will not be needed when the secondary server is re-synched with the primary server. Another factor the administrator must consider is the current processing and resource load of the video servers. If the missing videos are staged in at a high rate of transfer, the normally scheduled staging of content may be slowed down and also the quality of the videos being played may be degraded. Staging and playing of videos consumes a certain amount of CPU (Central Processing Unit) and data bus bandwidth and the administrator can not allow any degradation of the video quality.

The problem is further complicated since the CPU and data bus utilization is very dynamic and the administrator has no way of measuring the current load and predicting load changes in the near future. Also, the administrator may be located across the country in which case the administrator may not have access to the current schedule and will not be able to prioritize the order of staging videos.

Another serious problem is that the administrator has no way to start playing a missing video after it has been staged into the secondary server. If the missing video is a two hour movie for example, the server output port will be idle for up to two hours until there is a command to play the queued video. Even if the administrator could play the video, the administrator would first have to query the current location within the movie being played by the primary server, and then "fast forward" to that point. This cannot be done manually with any kind of accuracy, even with highly trained personnel.

More specifically, in the video broadcast industry, standards require the start of video playout to be "frame accurate". This frame accuracy is achieved by the use of master automation control computers to control video devices such as video tape recorders and digital video servers. Videos are played out according to the air times specified in a playlist and a minimum of two server commands are required to play a video, i.e. a "queue" command and a "play" command. Implicit in the queue command is the starting point of the video which is assumed to be the first frame. To start a video at some time offset into the video, a "queue with data" command is used which specifies the starting offset in hours, minutes, seconds and frames. As hereinbefore discussed, broadcast studios typically employ a second video server as a hot standby in case the primary server fails. By executing identical playlists in a master control automation computer, both servers stream the same videos out of the same ports at precisely the same play offset. When the primary server fails, the secondary server is promptly switched on-air and now becomes the primary or "on-air" server.

However, while the secondary server is down, all master automation commands sent addressed to the secondary server fail. When the failed server is repaired and brought back on-line, the stream outputs remain black because master control automation is not designed to restore service. The secondary server will not be synched up with the primary server until the next queue and play commands are executed for each port which may be anywhere from 2 seconds to two hours in the future. To restore service promptly, a broadcast engineer would have to take manual control of the secondary server's playlist and execute a "Queue With Data" command using a start offset that was manually calculated, followed by a "Play" command. This must be done for each server port with an active stream. This manual restoration procedure is difficult and error prone for even a skilled broadcast engineer and to sync up the streams of the secondary server with the streams of the primary server within even 2 seconds of each other is adventitious, and even that is far less accurate than the desired frame specific standard which is sought.

Accordingly, there is a need for an enhanced method and processing apparatus which are effective to synchronize primary and secondary video servers in a video transmission system to a high degree of accuracy with respect to video content and video streaming functions of the transmission system.

SUMMARY OF THE INVENTION

A method and apparatus are provided in which primary and secondary servers are coupled together for furnishing a backed-up video streaming function for outputting a series of video content presentations to a user group. The primary server functions as the primary provider of the video files and the secondary server is synchronized with the primary server to operate as a "hot stand-by" to back-up the primary server. The exemplary synchronization methodology may be implemented initially to synchronize the primary and secondary servers, and may also be subsequently implemented in the event that the primary and secondary servers become unsynchronized for any reason. In the event the primary server is disabled, the secondary server takes over for the primary server in furnishing video content in accordance with a common playlist. When the secondary server goes down for any reason, the methodology effectively synchronizes the video content and the video stream of the secondary server with that of the primary server such that the required back-up function of the secondary server can be resumed without interruption of the video file streaming process.

BRIEF DESCRIPTION OF THE DRAWINGS

A better understanding of the present invention can be obtained when the following detailed description of a preferred embodiment is considered in conjunction with the following drawings, in which:

FIG. 2 is an illustration of master control playlists used to control primary and secondary servers shown in FIG. 1;

FIG. 5 is another exemplary display screen which may be implemented in connection with the disclosed methodology;

FIG. 6 is also an exemplary display screen which may be used in connection with the disclosed methodology;

DETAILED DESCRIPTION

Figure 1:
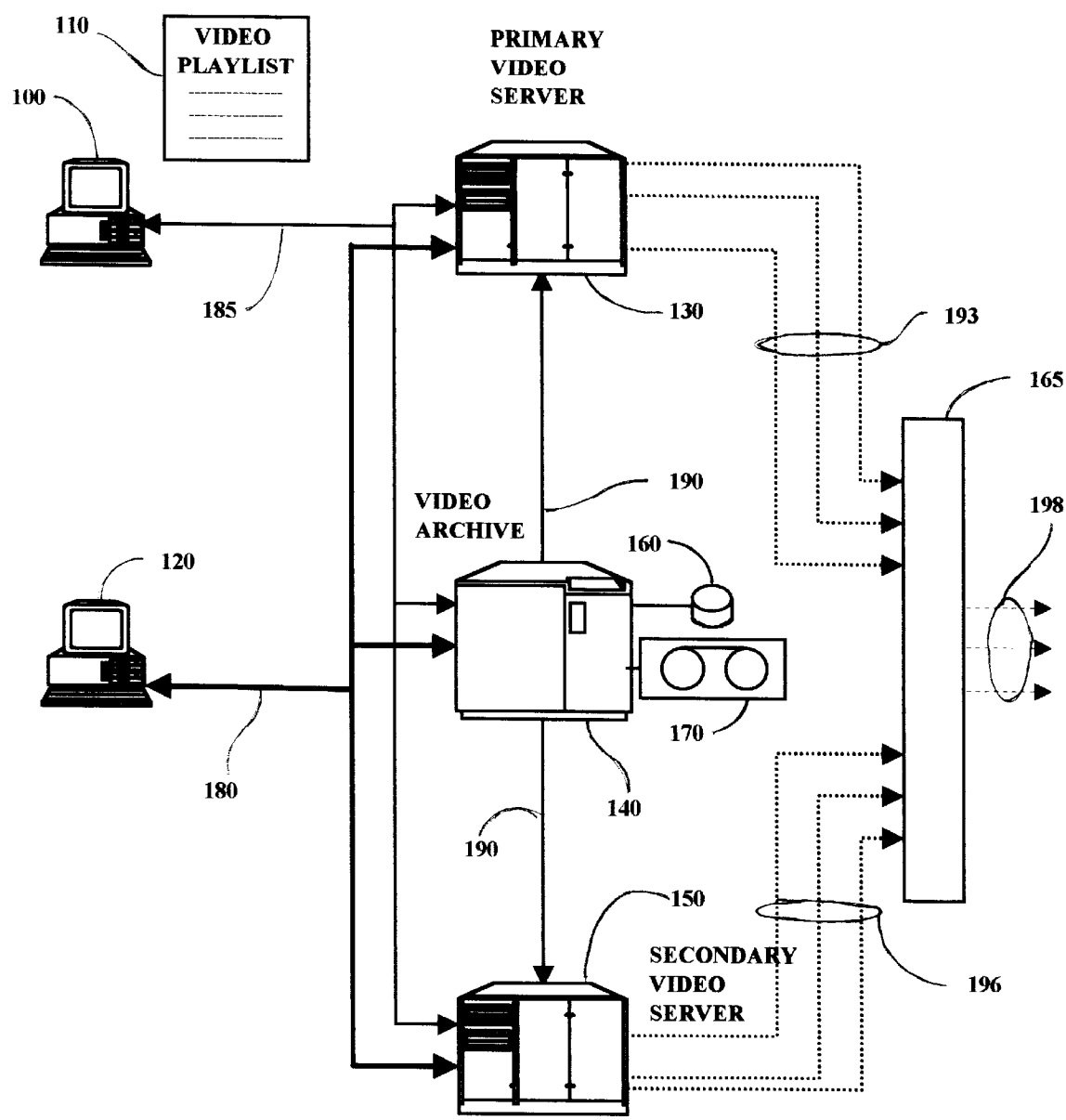
FIG. 1 is a simplified schematic diagram illustrating a primary and secondary servers in an exemplary video transmission system.

With reference to FIG. 1, there is illustrated a typical dual video server configuration in which a primary server 130 plays out video clips directly to air while a secondary server 150 operates as a "hot standby", i.e. the secondary server 150 is initially synchronized with the primary server, and carries the same video content as the primary server 130. The secondary server 150 stands-by to be switched to provide the common output "to air" 198 (for broadcast) in the event the primary server becomes unable, for any reason, to provide the output of the primary server 130 to air 198. Both the primary video server 130 and the secondary video server 150 are controlled by a master automation computer 100 which executes a "playlist" 110. The playlist contains a list of video clips and the time of day that the clips are to be played in the exemplary embodiment. The master control automation server 100 controls both the primary and the secondary servers via an industry standard connection 185 and related protocols. Both the primary server 130 and the secondary server 150 stream composite analog video 193, 196, respectively, into an analog video router 165 which is configured to switch inputs from the video servers to air 198. For example, in the event of a primary server failure, the router 165 is commanded to switch the output of the secondary video server 150 to air 198.

A video archive unit 140 is connected to both the primary server 130 and the secondary server 150. The video archive has a large quantity of hard disk storage 160 attached. To further accommodate the long term retention of video data, a tape library 170 is also connected to the archive 140. The total amount of video storage available to the archive may reach many hundreds of hours. The archive 140 is connected to the primary server 130 and the backup or secondary server 150 via high bandwidth connections 190 which may employ a protocol such as the ATM (asynchronous transfer mode) to facilitate a fast transfer rate.

A second computer workstation 120 is configured as a synchronization manager to manage the transfer of video content from the archive device 140 to the primary server 130 and the secondary server 150. The synchronization manager device 120 commands and controls the transfer of video content by means of a LAN (local area network) connection 180 in the present example.

FIG. 2 illustrates an exemplary playlist. The master control automation server 100 executes two playlists simultaneously, a first playlist 200 for the primary video server 130 and a second playlist 210 for the secondary video server 150. The two lists are identical except for the target device name 221 in column 2.

The playlist contains the time the video is to air 223, the video name 224 and title 225, and the duration 226 of the video clips. In addition, the status 222 of the video is displayed. Examination of the playlist shows that entry #23 and entry #24 have played out and reflect a "Status" 222 of "Complete". Entry #25 has a "Status" 222 of "Play" indicating that it is the on-air event. Entry #26 as illustrated, is queued to play out next.

Entry #29 is a video with a "Status" of "Staging". The automation controller 100 checks that each video in the playlist in physically on the video server. Whenever a video in the playlist is not found on the server, the controller 100 automatically issues a stage command to the server 130 which causes the video server to retrieve the video from the video archive 140.

Figure 3:
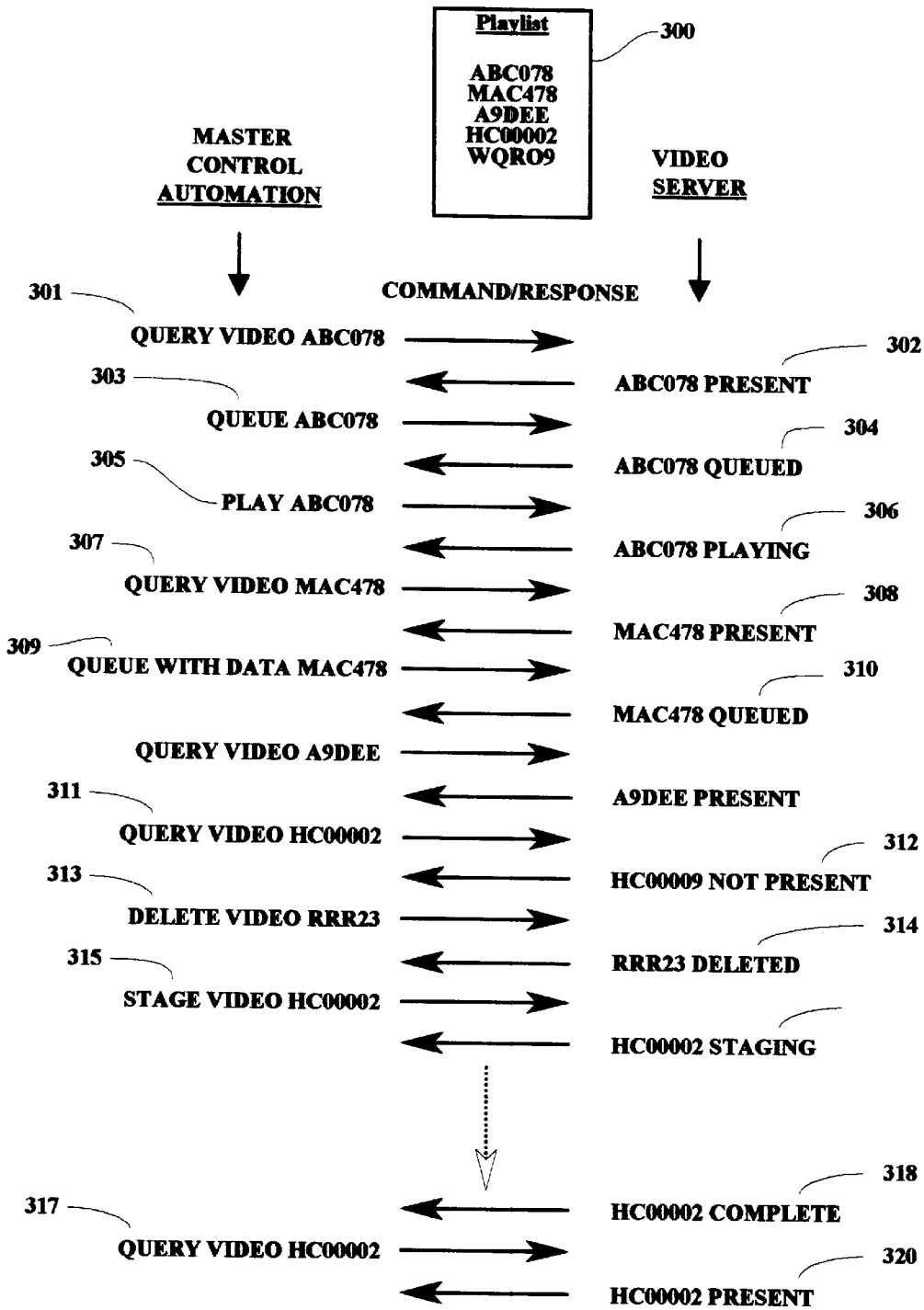
FIG. 3 is an illustration of a command and response sequence between the master control and a video server.

Master control automation commands and controls video servers by means of a video disk protocol. FIG. 3 illustrates typical command/response exchanges between master automation and the video server that are triggered by playlist execution. In FIG. 3, a playlist 300 contains five videos scheduled for playout in serial fashion. When the playlist is first loaded for execution, the controller 100 queries the video server 130 to see if the first video, i.e. "ABC078", is loaded 301. The video server responds in the affirmative 302 and the controller immediately commands the server to queue the video 303. Once the server acknowledges the queued video 304, the controller 100 then commands the server to play 305 the first video. The next video in the playlist, i.e. "MAC478", is then verified as present 308 and queued 310.

Continuing down the playlist, the controller verifies that all the listed videos are present. In response to the query of video "HC00002" 311, the server returns a "video is not present" status 312 which necessitates the loading of video HC00002 from the video archive 140. In order to make room on the hard disk of the video server for video HC0002, the controller 100 first issues a "delete video RRR2311" command 313 to the server 130. After the video has been deleted 314, the controller 100 then sends a "stage" command 315 which causes the video server 130 to request video HC0002 from the video archive 140. Once the loading of the video HC00002 has commenced, the server 130 acknowledges to the controller 100 that the stage is underway 316. When the load completes, the server 130 passes a status of "stage complete" 318 to the controller 100, and a "query video" command is returned 317 to determine that the loaded video HC0002 is actually present 320 on the server 130.

These controller-server transactions take place between the controller 100 and both video servers 130 and 150 because there is a separate playlist executing in the controller 100 for each server in the present example. In this fashion, the video content on both the primary server 130 and secondary server 150 stay in sync with the result that the content of the secondary video server 150 being a mirror image of the content within the primary video server 130 in both content and video streaming.

In order to meet the stringent timing requirements of the broadcast video industry, the controller will nominally query the status of the video servers every 33 milliseconds. The transactions shown in FIG. 3 can complete in time periods of between 33 milliseconds to two seconds, depending on the type of command. When the playlist contains short duration videos (i.e. 2–5 second clips), a great deal of activity can take place between the controller and the video server in a short period of time. It can be seen that if the secondary server were to experience an outage and hence be unable to accept and respond to master automation delete and stage commands, the secondary server hard disk would, after some time, no longer be a mirror image of the primary.

Figure 4:
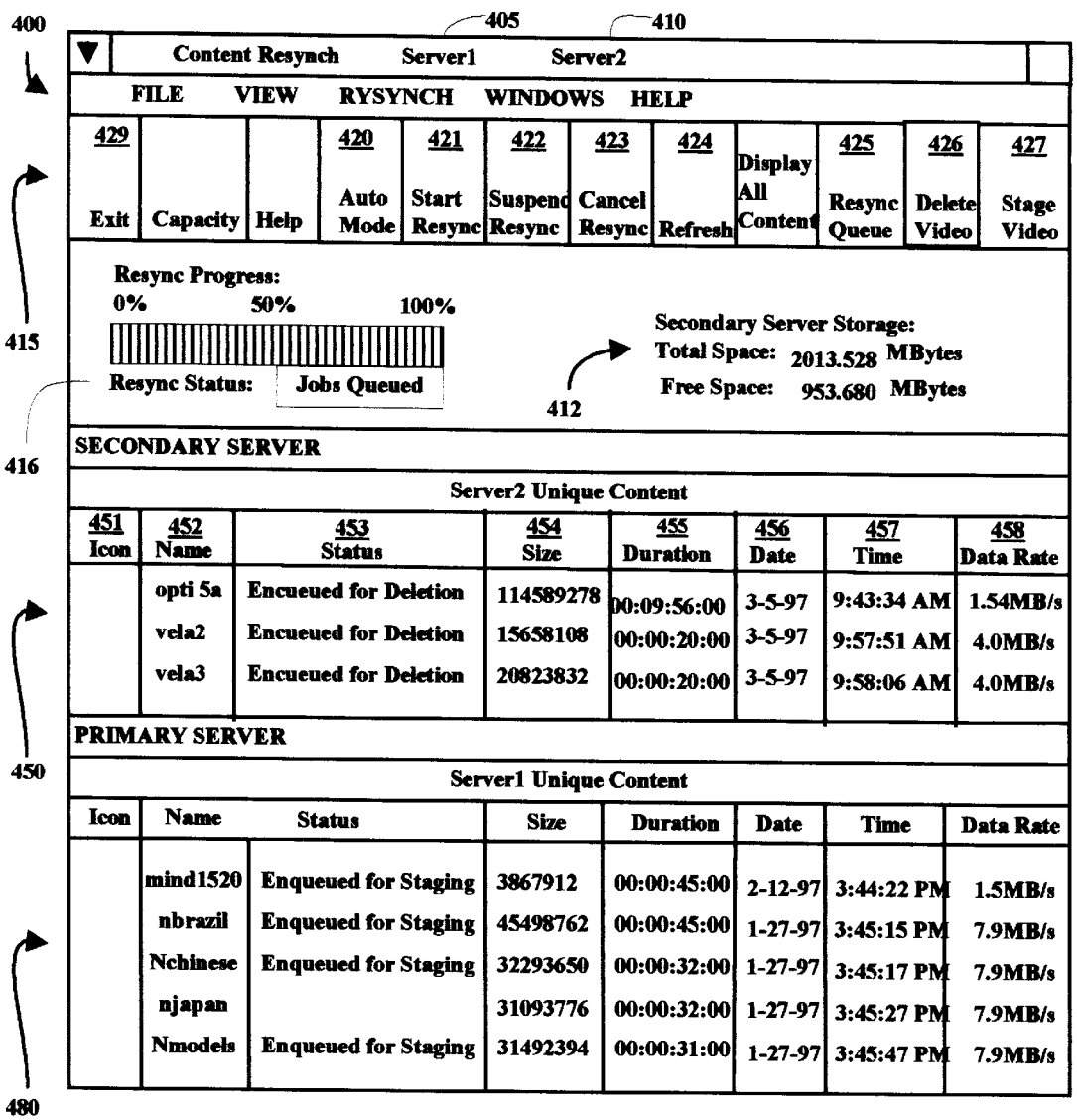
FIG. 4 is an illustration of an exemplary display screen which may be used in an exemplary implementation of the disclosed methodology.

FIG. 4, FIG. 5 and FIG. 6 illustrate several exemplary screen displays which will be referred to parenthetically in connection with the following operational descriptions.

Figure 7:
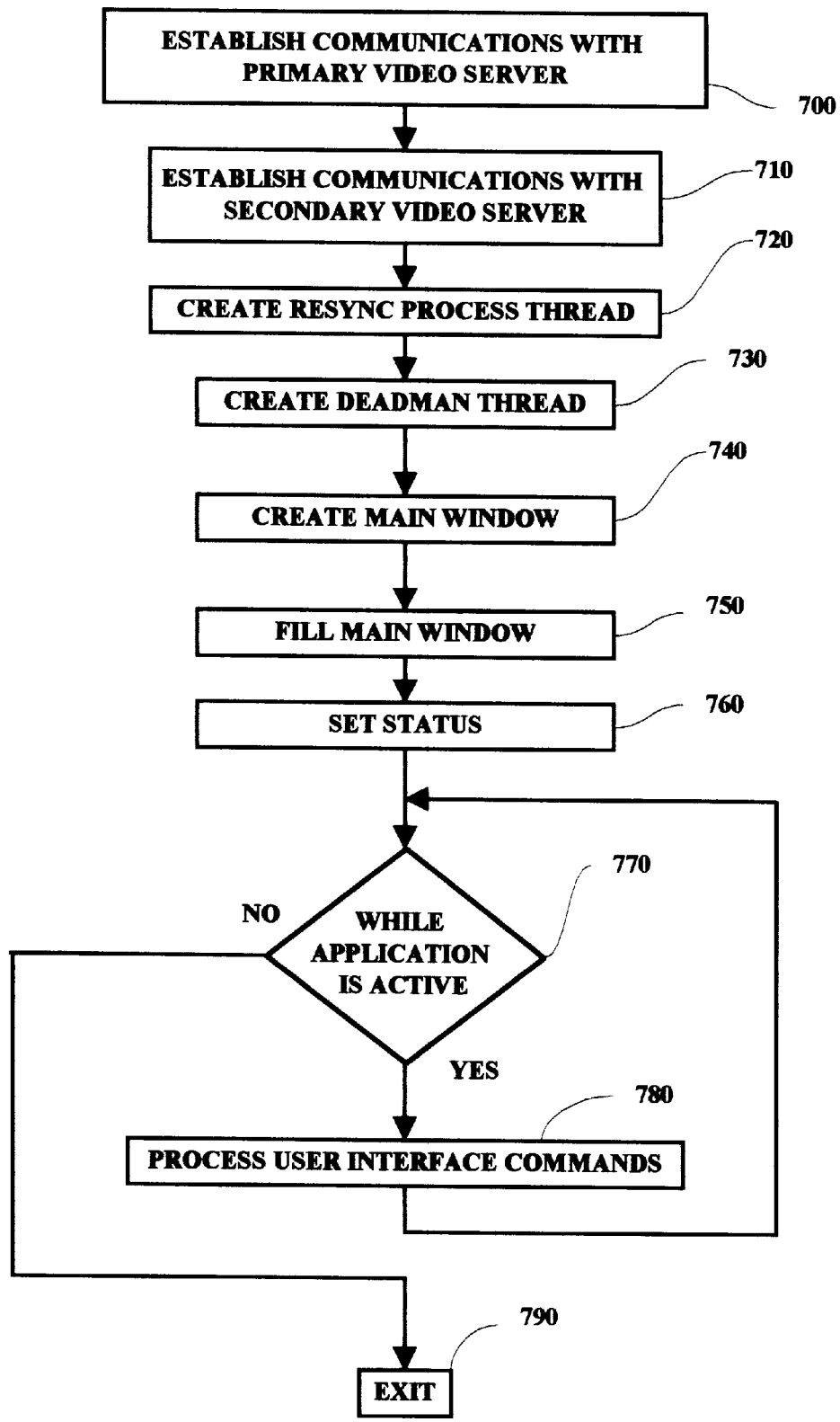
FIG. 7 is a flow chart illustrating an overall sequence of operations as implemented in the disclosed exemplary system.

FIG. 7 illustrates the logic flow invoked at application initialization. The application begins by establishing communications with the primary 700 (405) and secondary 710 (410) video servers that were specified by the user at application startup. Then two background threads are created, the resync process thread 720 and the deadman thread which 730 which enter their respective wait states 1910 (FIG. 19) and 2100 (FIG. 21), respectively. These threads control the resync process and execute in the background to keep the main work thread FIG. 7 from being overloaded.

Figure 8:
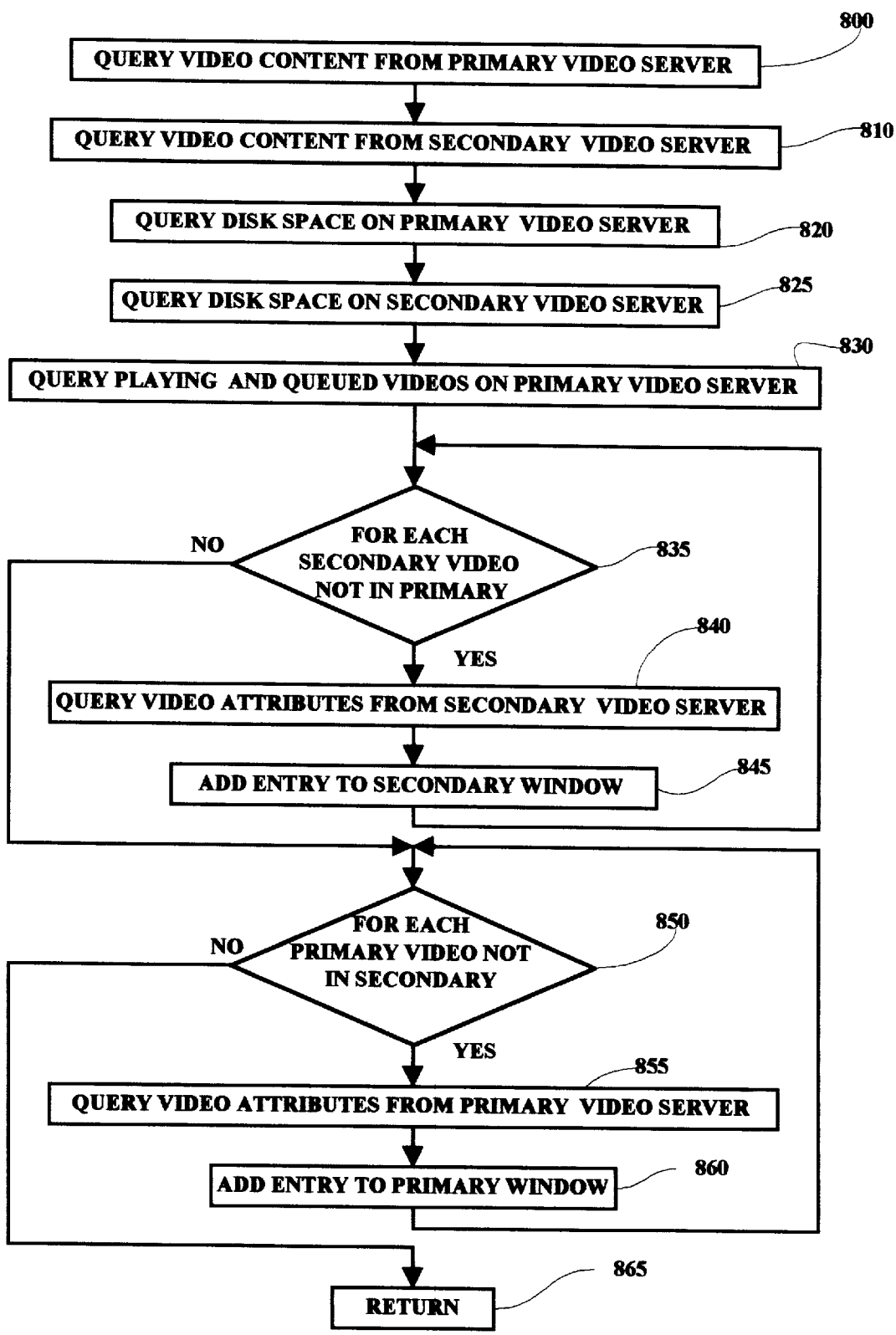
FIG. 8 is a flow chart illustrating a "Fill Main Window" routine.

The main application windows are then created 740 (450, 480) and a subroutine is called to fill them in 750. In FIG. 8, the Fill Main Window routine begins querying the video contents of both the primary 800 and the secondary 810 video servers. Then a second call is made to each server to query the amount of total and free hard disk space that is available 820 and 825 (412). Finally a query is made of the primary video server 830 to determine which videos are in a playing or queued state. Only the videos that are unique to each video server will be displayed so the next operation is to enter a loop 835 where each video in the secondary server is compared to the list of videos in the primary server. If the video is not present in the primary, it is considered an extraneous video and the video attributes are queried 840 and the video is inserted in the secondary's main window 845 (450).

Figure 11:
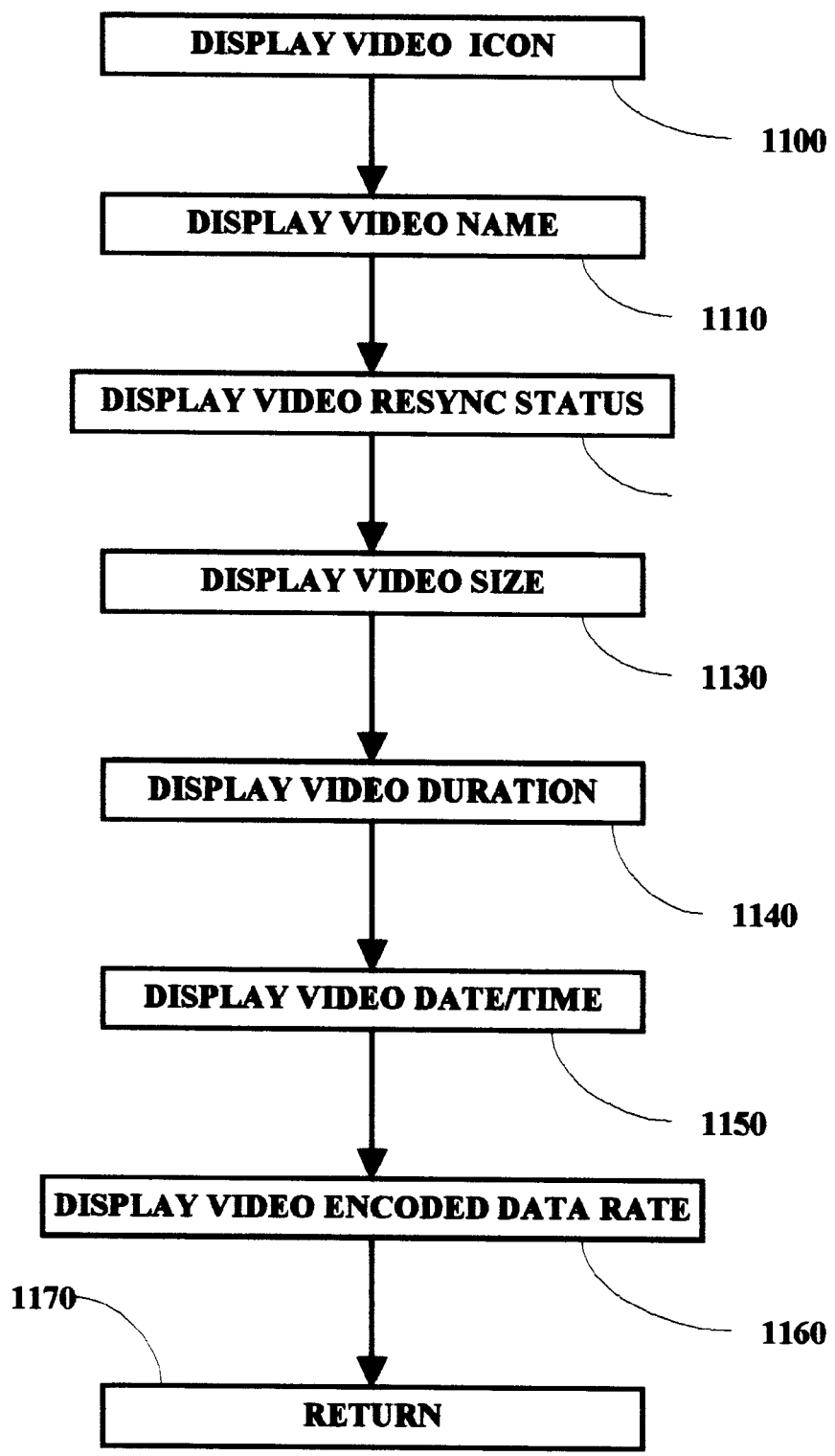
FIG. 11 is a flow chart illustrating the "Add Entry To Secondary Window" routine.

The Add Entry to Secondary Window routine is shown in FIG. 11. The entry begins (pictorially shown in FIG. 4) with a video icon 1100 (451) followed by the video name 1110 (452), size 1130 (454), duration 1140 (455), creation date and time 1150 (456,457) and the encoded bit rate of the compressed video 1160 (458). In step 1120, the current video status is assessed and displayed (453).

After returning 1170 to the caller, the secondary loop 835 continues until each secondary video has been processed, at which point the loop exits to operation 850 which is the start of the primary video loop. Each primary video is compared to the secondary videos to determine if it is missing from the secondary's hard drive. For each missing video, the attributes are again queried 855 and the video is added to the main window 860 (450) of the secondary server.

Figure 10:
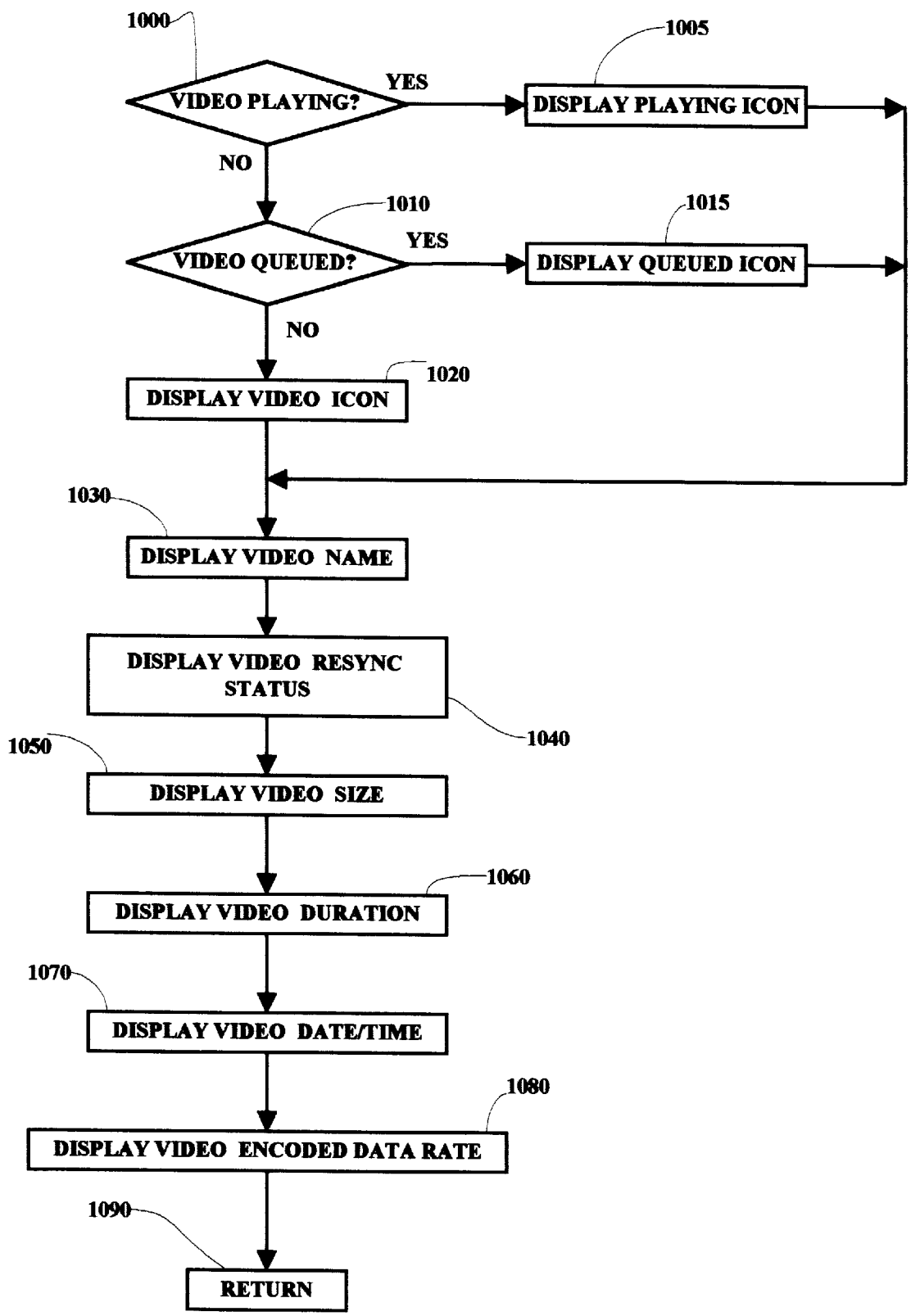
FIG. 10 is a flow chart illustrating the "Add Entry To Primary Window" routine.

The Add Entry to Primary Window routine in FIG. 10 is very similar to the routine used to fill in the secondary window with a notable exception. A test is made to see if the video is currently playing 1000. If so, a 'playing icon' is displayed 1005 to alert the user that a playing video is missing from the secondary. If the video is not playing, a second test is made to see if the video is queued 1010. If so, a 'queued icon' is displayed 1015, to reflect its status. If the video is not playing or queued, a normal video icon is used 1020. The rest of the routine duplicates the processing of the secondary. The video name 1030, status 1040, size 1050, duration 1060, creation date and time 1070 and the encoded bit rate of the compressed video 1080 are displayed in the primary's window.

The Fill Main Window routine continues to loop 850 through each primary video to ascertain which videos are missing from the secondary server. When all primary video have been processed, control is returned 865 to the initialization routine. After setting status 760 and displaying the amount of free hard disk space, the main thread enters a loop 770 where it responds to user keyboard and mouse activity. As user commands are processed 780 are they are entered. The loop 770 is not exited until the user closes the application at which time the program exits 790.

Figure 9:
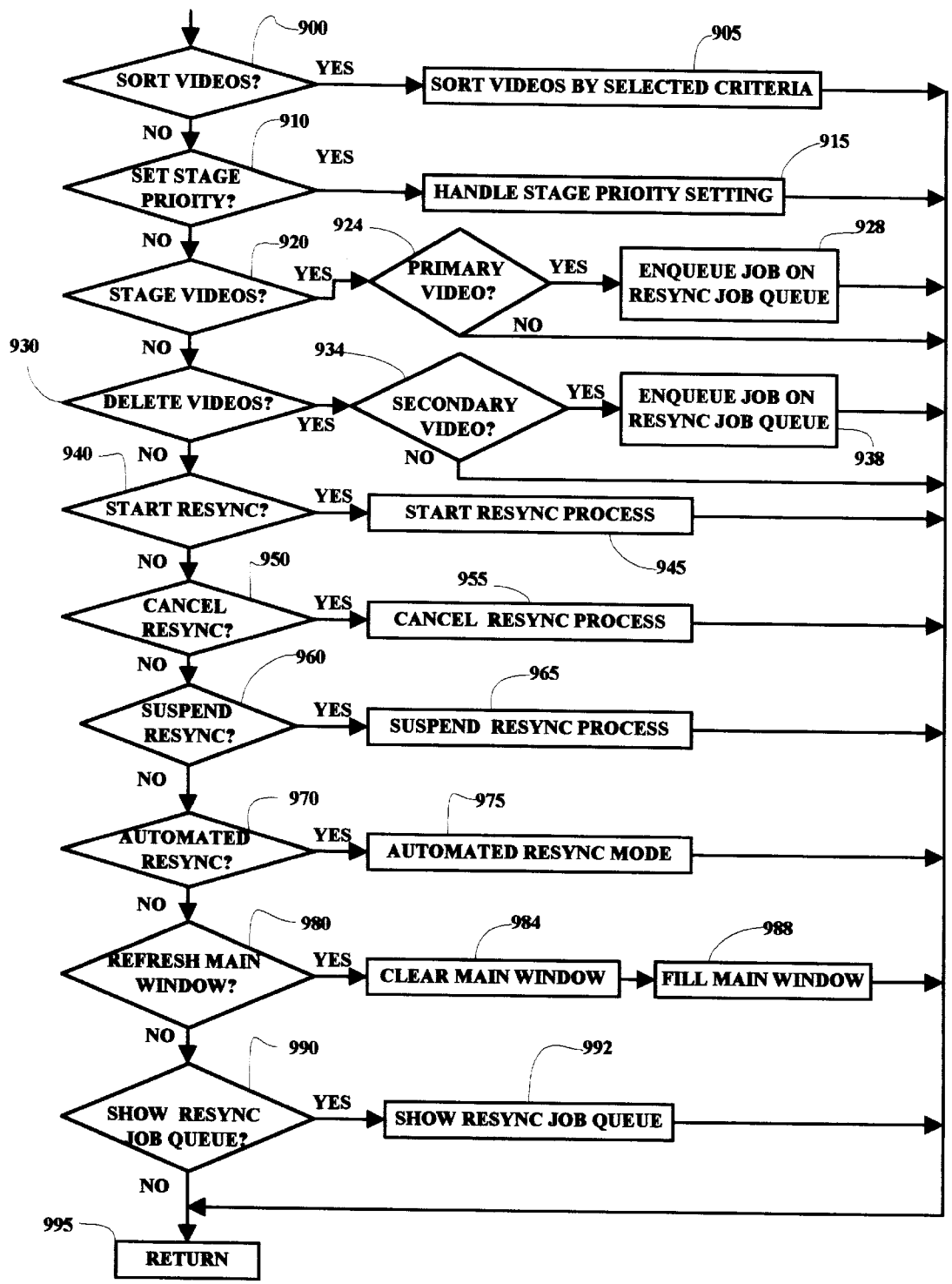
FIG. 9 is a flow chart illustrating the logic to handle user commands.
Figure 18:
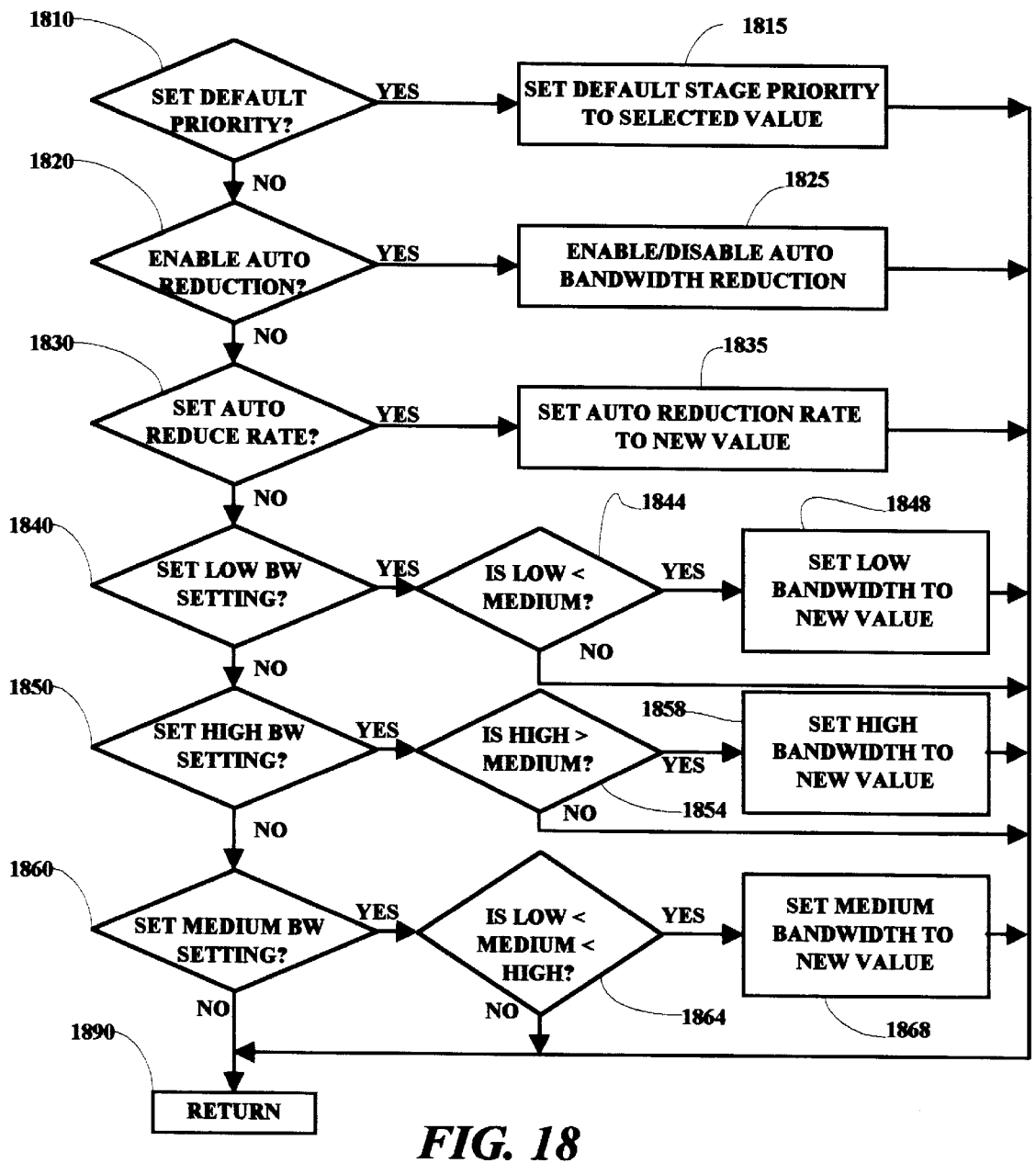
FIG. 18 is a flow chart illustrating the "Handle Stage Priority" routine.

FIG. 9 contains the logic to handle user commands invoked by either mouse or keyboard. Operation 900 handles the request to sort the videos in the main window. The user may sort by several criteria (e.g. video name, video size, video duration) and this is done is step 905. Next, the command to set stage priorities is filtered 910 and processed 915 by calling the Handle Stage Priority Routine in FIG. 18.

When videos are staged from the primary to the secondary video server, the speed at which they are transferred must be governed to preclude overloading the server. Video servers have limited bandwidth capability and some bandwidth must always be preserved for streaming videos which is the server's main purpose. If resync staging consumes too much bandwidth, current streaming operations will be degraded and new requests to stream videos will fail. In addition to streaming, the server may be staging a video in from the video archive 140 which also consumes bandwidth. Ideally, a missing video should be staged as fast as possible without degrading current video or staging operations. By setting stage priorities, the user may allocate higher bandwidth (i.e. priority) to the resync staging according to need. A video that is to air within 10 minutes may be staged at maximum priority while a video that is need in 24 hours may be staged at a much lower priority.

The Resync Stage Priority window 600 is shown in FIG. 6. The routine begins by filtering the command to set the priority default 1810. There are 4 priorities, maximum, high, medium and low. The default setting 1815 (610) is assigned to each stage operation that is placed on the resync job queue. Next, the request to enable/disable automatic bandwidth reduction 1820 (630) is detected and processed 1825. When automatic bandwidth reduction is enabled, the resync application queries the primary and secondary servers to determine if a video archive 140 stage operation is in progress. If so, the resync stage job is automatically lowered in bandwidth to give priority to the archive stage. In operation 1830, the user specifies the bandwidth setting to use 1835 (635) when automatic reduction is enacted. Next a series of tests are made to handle requests (620) to specify the bandwidth setting for low 1840, high 1850 and medium 1860 priorities. Users are free to set any amount of bandwidth desired, however checks are made to ensure that the low setting is lower than medium 1844, the high setting is greater than medium 1854 and the medium setting is greater than the low and less than the high 1864. If these checks pass, the settings are updated accordingly in operations 1848 (640), 1858 (641) and 1868 (642).

Returning to FIG. 9, requests to stage (427) a missing video are processed 920. Only missing videos are permitted to be staged and staging always occurs from the primary to the secondary server. A check is made 924 to ensure the user is staging a primary video. If so, the video is placed on the resync job queue as a stage job 928.

Figure 16:
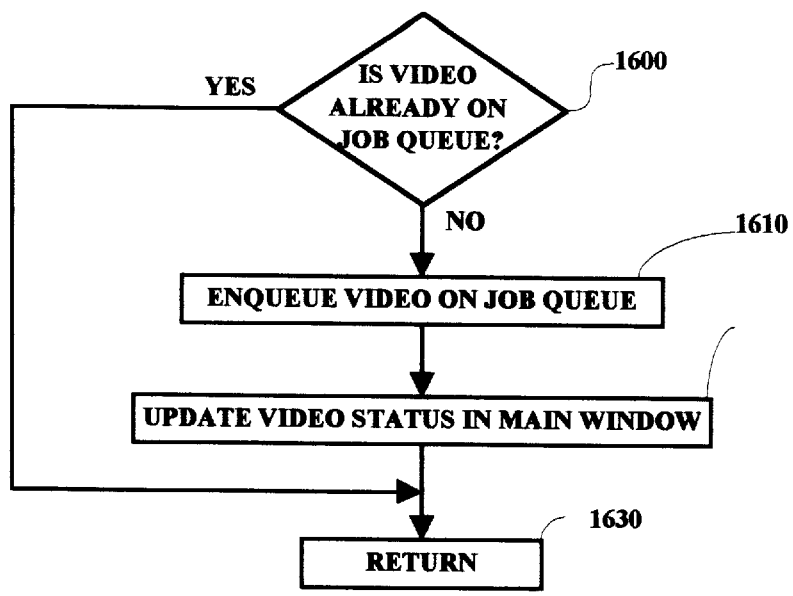
FIG. 16 is a flow chart illustrating the "Enqueue Job On Resync Queue" routine.

FIG. 16, Enqueue Job On Resync Queue, handles this request. The job queue is examined to determine whether the video already exists on the queue 1600. If not, the video is enqueued 1610 and the status of the video in the main window is changed to 'Enqueued for staging' 1620. The routine then returns 1630.

Figure 15:
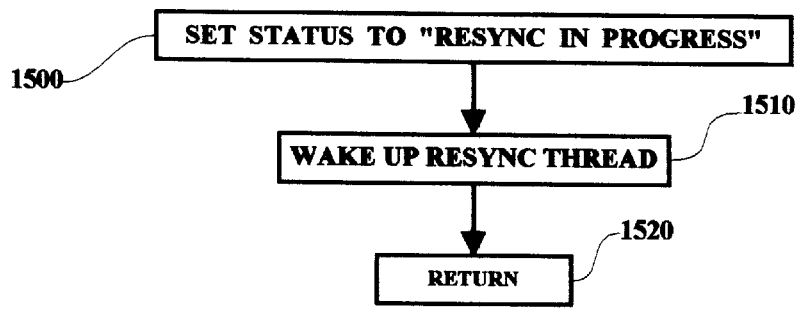
FIGS. 15A, 15B and 15C are flow charts illustrating various resync status routines.
Figure 15:
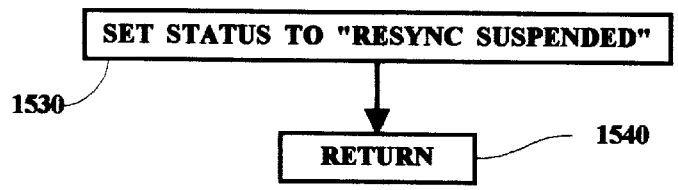
Figure 15:
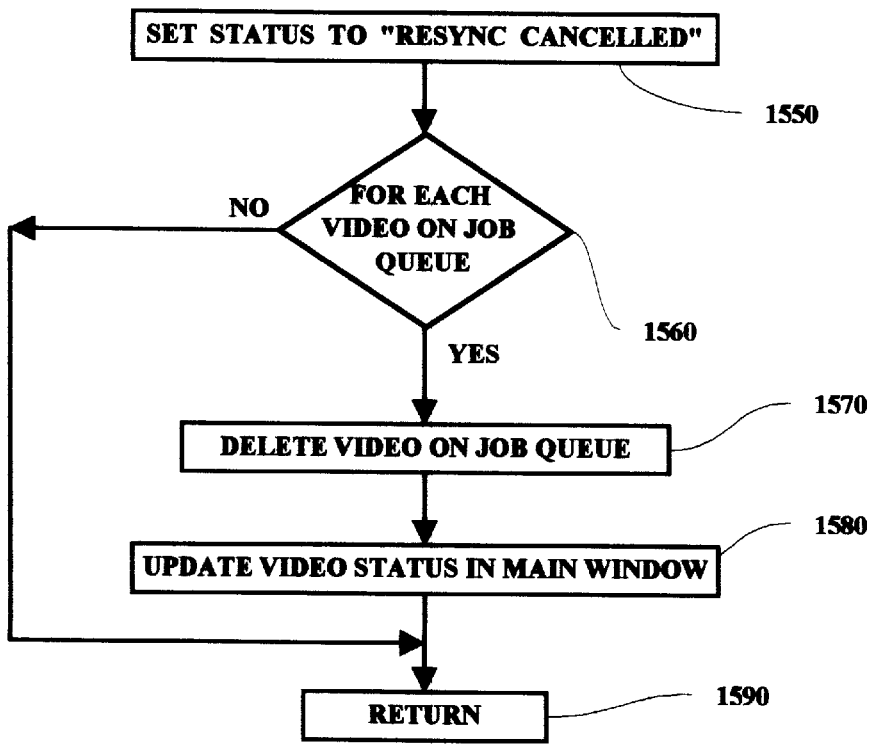

Next in FIG. 9, delete video requests (426) are handled 930. Only extraneous videos on the secondary may be deleted 934. This test protects the user from accidentally deleting video content from the primary server. If the selected video is on the secondary server, the delete request is enqueued on the resync job queue 938. After scheduling videos for stage or deletion, the user would then start the resync process to execute the resync jobs 940 (421). A call is made to the Start Resync Process 945 in FIG. 15A.

The Start Resync Process routine sets the resync status to 'Resync in Progress' 1500 and then wakes up the resync thread 1510 that was created during application initialization in operation 720. This initiates the execution of the enqueued resync jobs as an autonomous background task. This completes the Start Resync Process routine 1520.

In operations 950 and 960, user commands to either cancel (423) or suspend (422) the resync process are handled. A user may cancel or suspend the resync process at any time. Suspend, shown in FIG. 15B, changes the resync status to 'Suspended' 1530. This status change is detected by the resync process background thread which enters a wait state until the resync process is restarted. The Cancel Resync Process, FIG. 15C, changes the resync status to 'Canceled' 1550 and then loops through each remaining resync job on the queue 1560 first deleting it 1570 and then updating its status in the main window as 'stage/delete request canceled' 1580.

Returning once more to FIG. 9, a request to auto-resync 420 the secondary server is trapped 970 and processed 975. User may opt to let the application automatically perform the resync if the disparity between the two servers is minor or the user has no need to manually control the resync operation.

Figure 17:
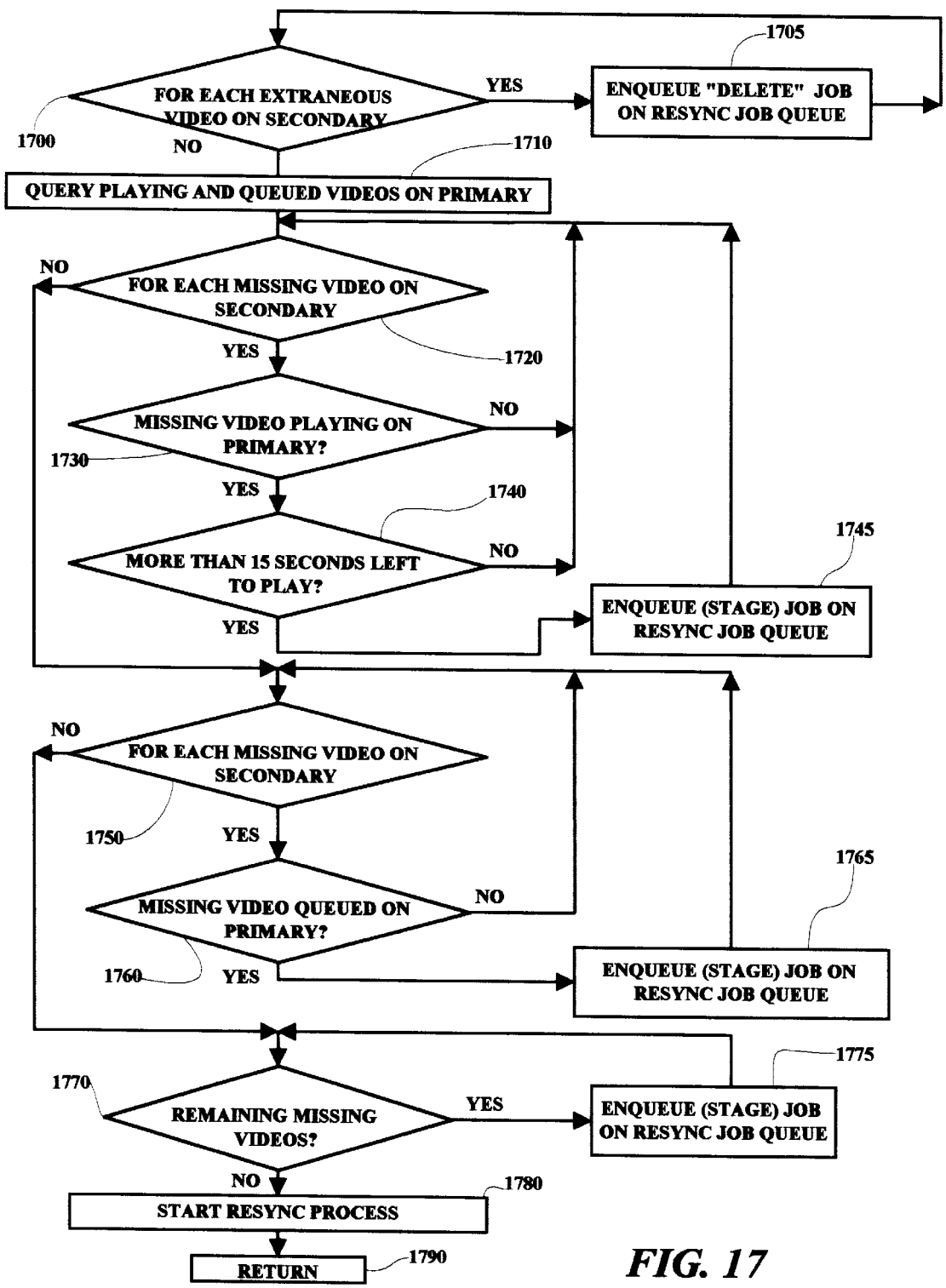
FIG. 17 is a flow chart illustrating the "Automated Resync Mode" routine.

The Automated Resync Mode, FIG. 17, details the steps taken to automate the resync process. Because video delete jobs typically execute in sub-second time and because the hard drive space may be needed for the subsequent stage requests, the routine begins by entering a loop 1700 where each extraneous video on the secondary server is scheduled to be deleted 1705. A call is then made to the primary server to query which videos are playing or queued to play 1710. A loop is entered 1720 where each missing video is examined to see if it is currently playing 1730 and if so, if there are more than 15 seconds of video time left 1740. If both tests pass, the video is scheduled for staging 1745. This places the playing videos at the top of the resync job queue. Another loop is then begun 1750 where each missing video is again examined to see if the video is queued to play in the primary server 1760. If so, the video is scheduled to stage next 1765. Finally, yet another loop is entered 1770 where all remaining missing videos are enqueued to be staged 1775. Having scheduled all extraneous and missing videos, the resync process is automatically started 1780 and the routine ends 1790.

As shown in FIG. 9, a request to refresh (424) the main window 980 is processed by first clearing the window 984 and then calling the Fill Main Window routine 988 to re-query the two servers and populate the main windows with the current extraneous and missing videos. The request to display the resync job queue 990 results in the calling of the Show Resync Job Queue routine 992.

Figure 12:
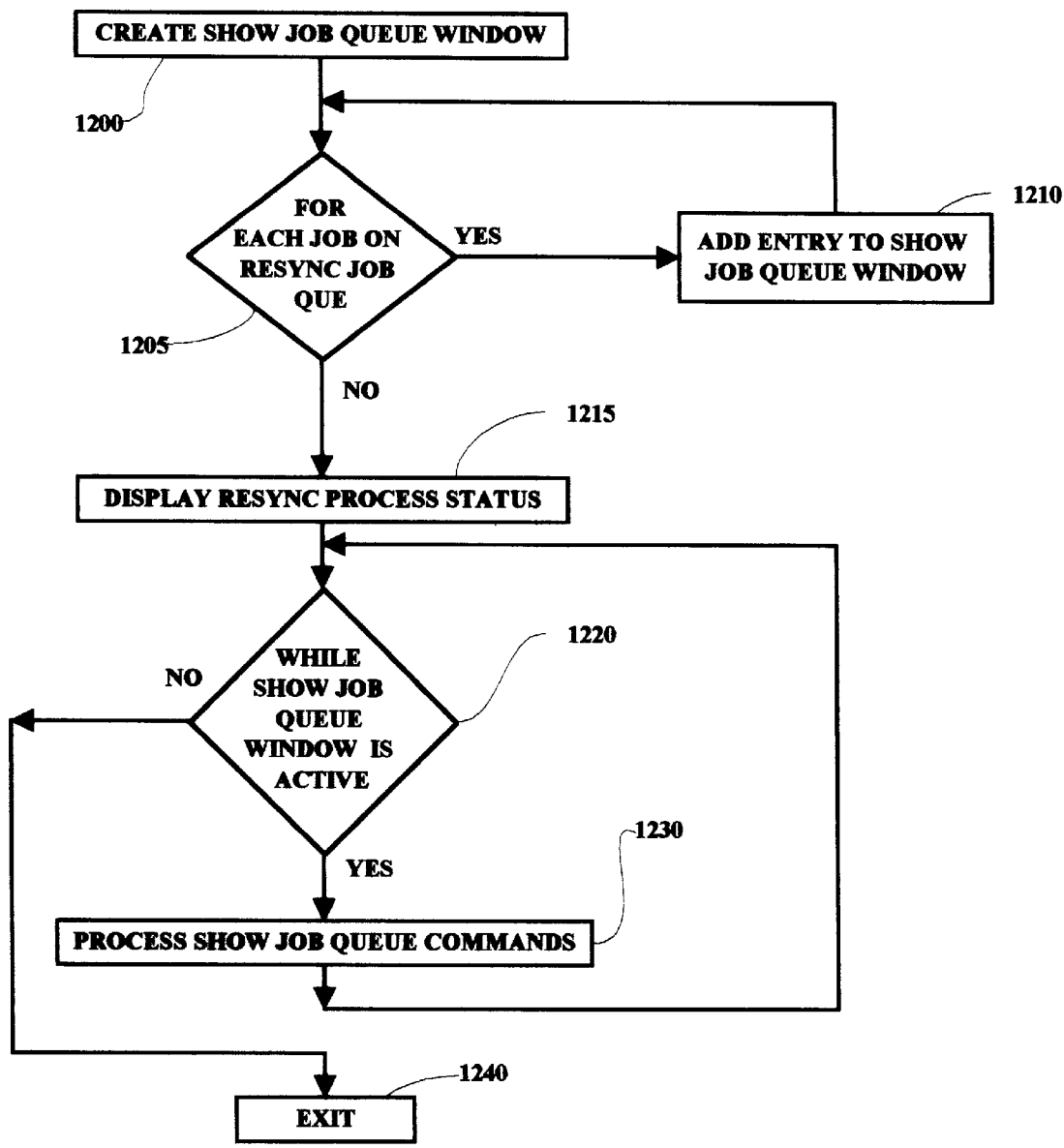
FIG. 12 is a flow chart illustrating the "Show Resync Job Queue" routine.
Figure 13:
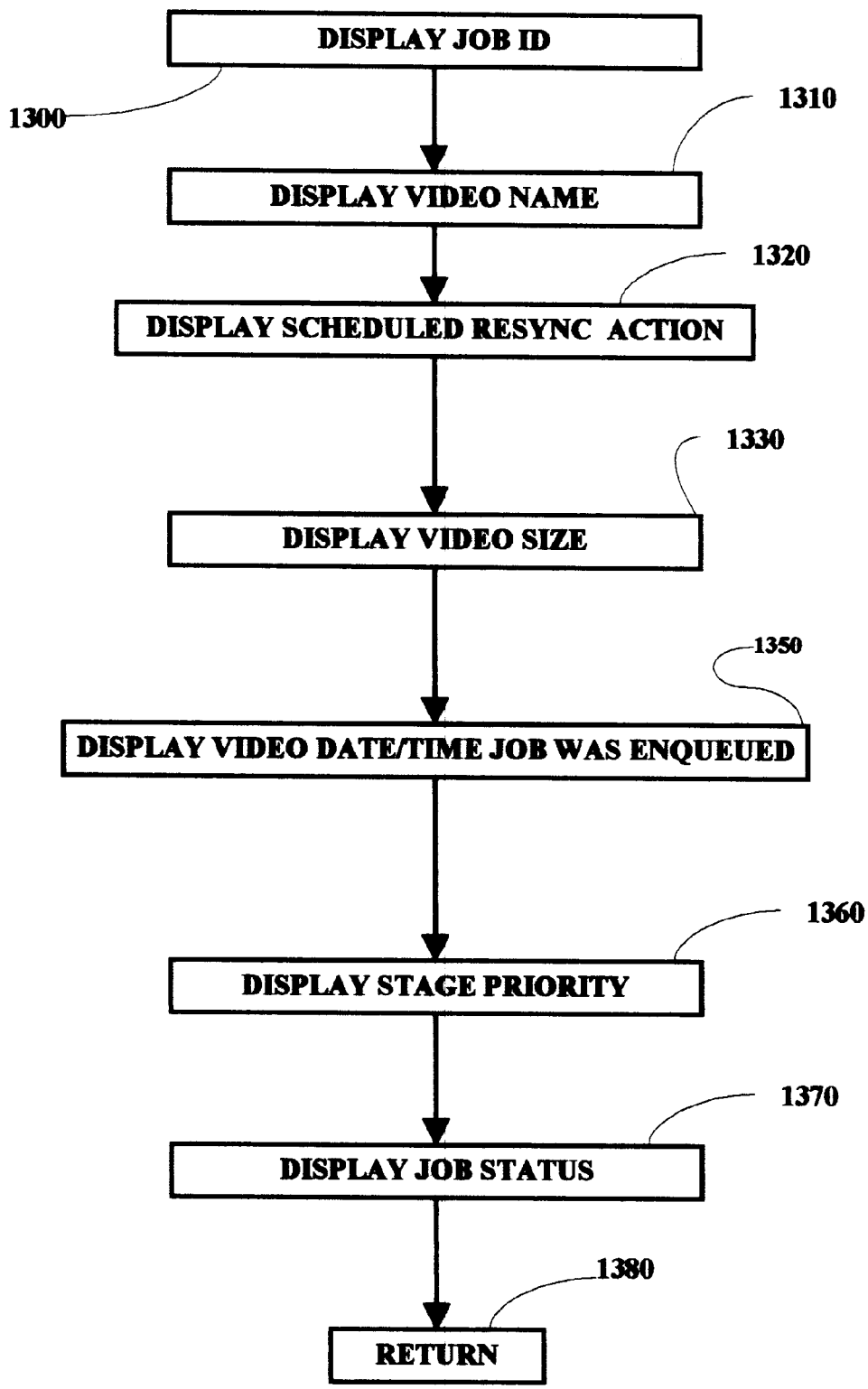
FIG. 13 is a flow chart illustrating the "Add Entry To Show Job Queue Window" routine.

The Show Resync Job Queue routine, FIG. 12, creates and controls the Resync Job Queue window in FIG. 5. The window is first created 1200 (500) then a loop 1205 is entered where each job on the queue is added to the job queue window 1210 (580). The Add Entry to Show Job Queue Window routine, FIG. 13, displays all pertinent information about the job. The job ID is displayed 1300 (520). Each job is assigned a unique job ID. The job ID is followed by the video name 1310 (521), the resync action 1320 (522) i.e. "stage" or "delete", and the video size 1330 (523). The date and time the job was enqueued 1350 (524, 525) is displayed as is the assigned stage priority 1360 (526). Finally, the status of the job is displayed 1370 (527). The status can set to the following: 1) Waiting in queue, 2) Job held, 3) Delete in progress, or 4) Stage in progress.

After populating the Show Job Queue window 1210, the current status of the resync process is shown 1215 (505) and a loop is entered 1220 for the duration of the window's existence where user interface commands are processed 1230. When the user dismisses the window, the routine exits 1240.

Figure 14:
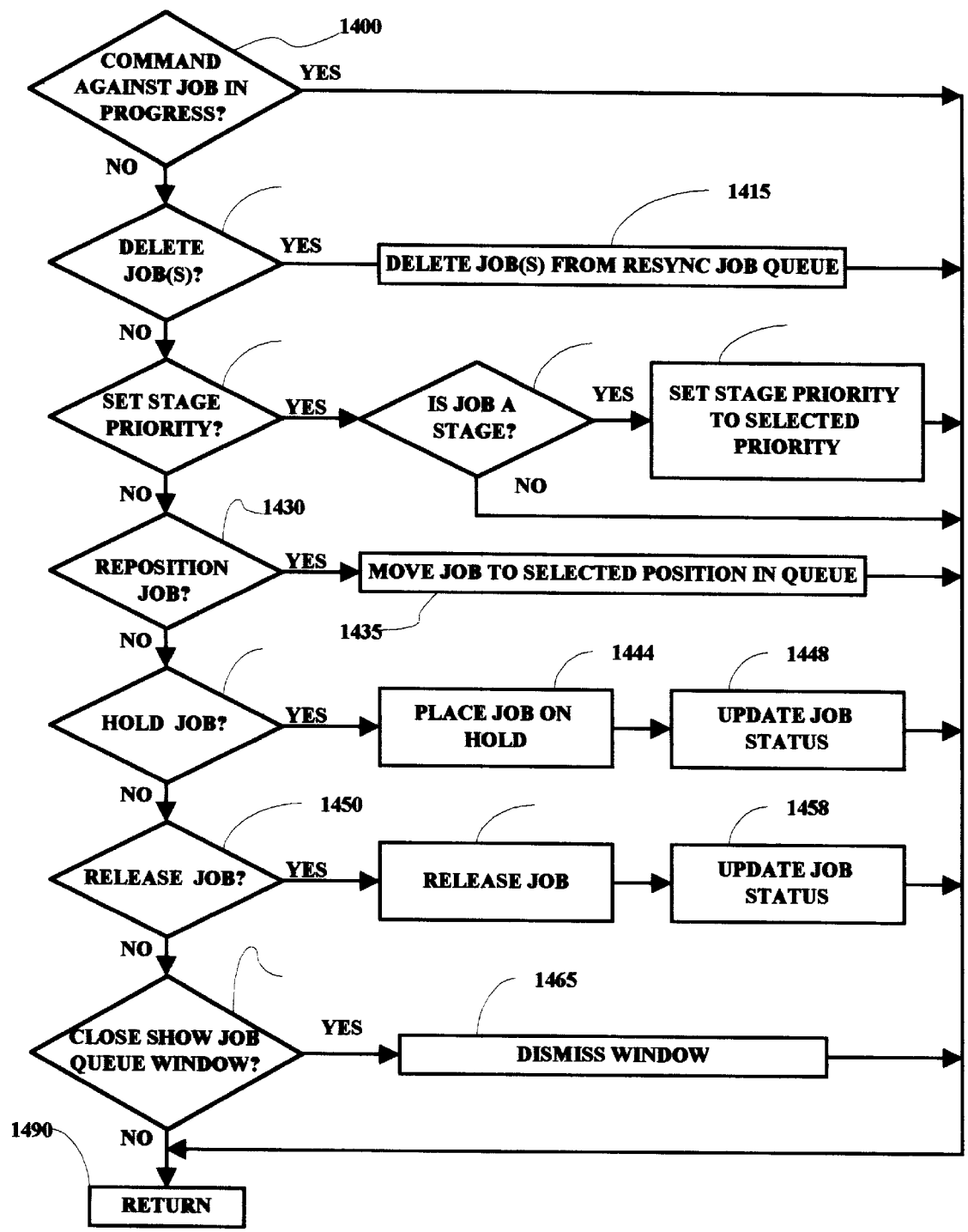
FIG. 14 is a flow chart illustrating "Process Show Job Q Command" routine.

Process Show Job Q Command, FIG. 14, processes mouse and keyboard commands received via the user interface. The resync job that is currently executing may not be modified or acted upon in any way once it has started, so the first test 1400 ensures the user isn't targeting the current job (510). If the user is deleting one or more jobs from the queue 1410, the job(s) is/are deleted 1415. If the user is adjusting the stage priority 1420, the check is made to ensure the job is in fact a stage job 1424, then the priority is changed to the selected setting 1428 (maximum, high, medium or low). Operation 1430 detects requests to reorder the jobs in the queue 1435. This may involve moving a job to the top or bottom of the queue. No restrictions are placed upon the user with regard to job order. In operations 1440 and 1450, the jobs are held or released respectively. Placing a job on hold prevents the resync process from executing it and the job is skipped over in the queue until a user later releases it. After holding or releasing the job 1444 and 1454, the status field in the window is updated accordingly 1448 and 1458. The final allowable action is to close the Show Job Queue window 1460 at which time the window is dismissed 1465. Dismissing the window causes an exit 1240 to occur in the Show Resync Job Queue routine.

Figure 19:
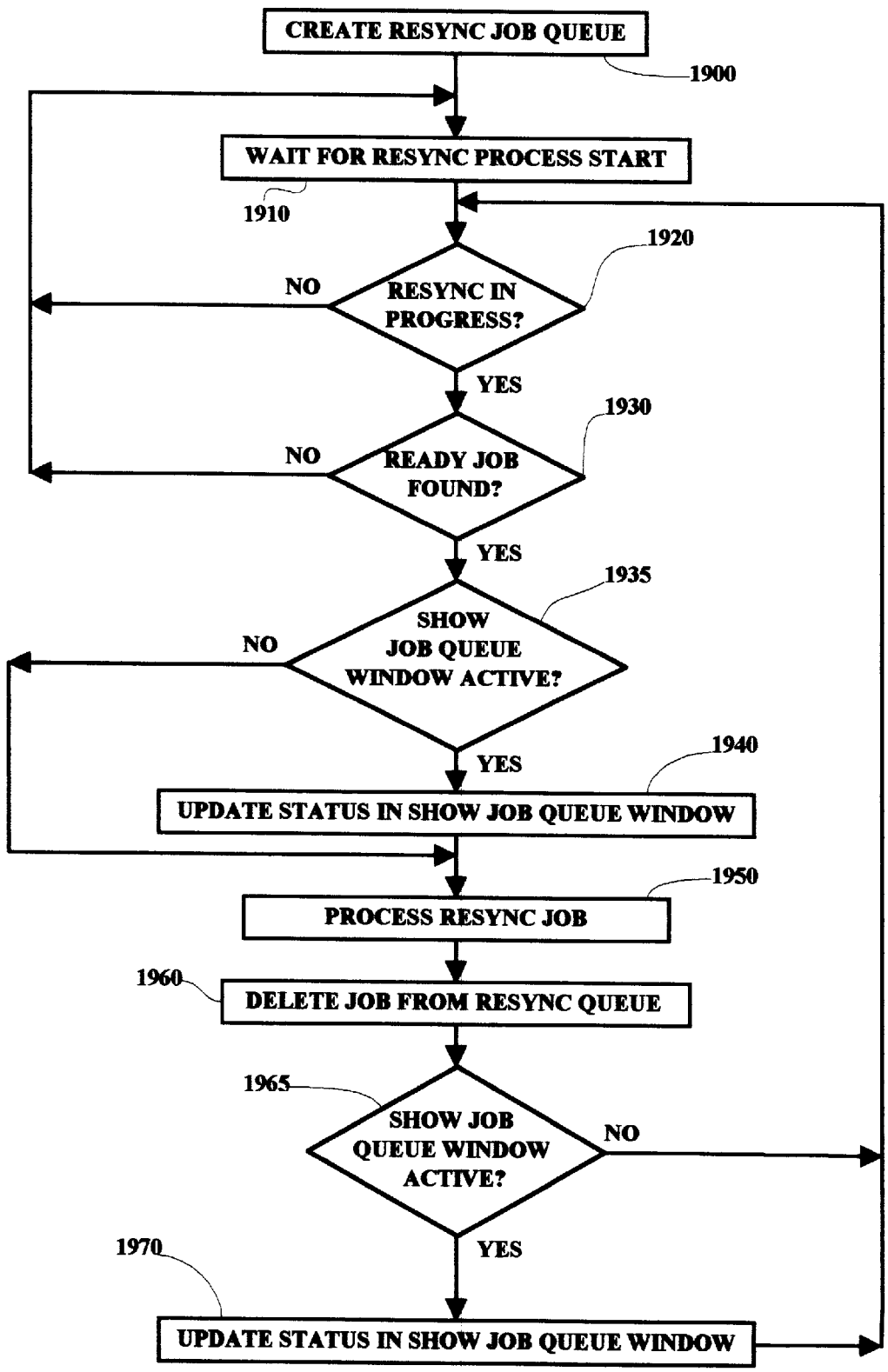
FIG. 19 is a flow chart illustrating the logic of the resync process thread.

FIG. 19 depicts the logic of the resync process thread. This thread is created at application initialization 720 at which time the thread creates resync job queue 1900, then enters a wait state 1910. The thread is thereafter awakened each time the user starts the resync process 940 (505). Upon awakening, the thread enters a loop 1920–1970 that executes each available job on the resync job queue. The loop starts by ensuring that the resync status is still 'In Progress' 1920. This resync status may be changed at any time by the user to canceled or suspended. If still in progress, the next ready job (i.e. non-held) is found 1930 and the job status is updated 1940 in the Show Job Queue window (500) if it is being displayed 1935. The Process Resync Job routine is then called 1950 to execute the job. Upon returning, the job is deleted from the resync job queue 1960 and again the status is updated 1970 (505) if the Show Job Queue window is active 1965. The loop exits under 4 conditions: 1) the resync process is canceled 1920, 2) the resync process is suspended 1920, 3) the resync job queue is emptied 1930, or 4) the resync job queue contains only held jobs 1930.

Figure 20:
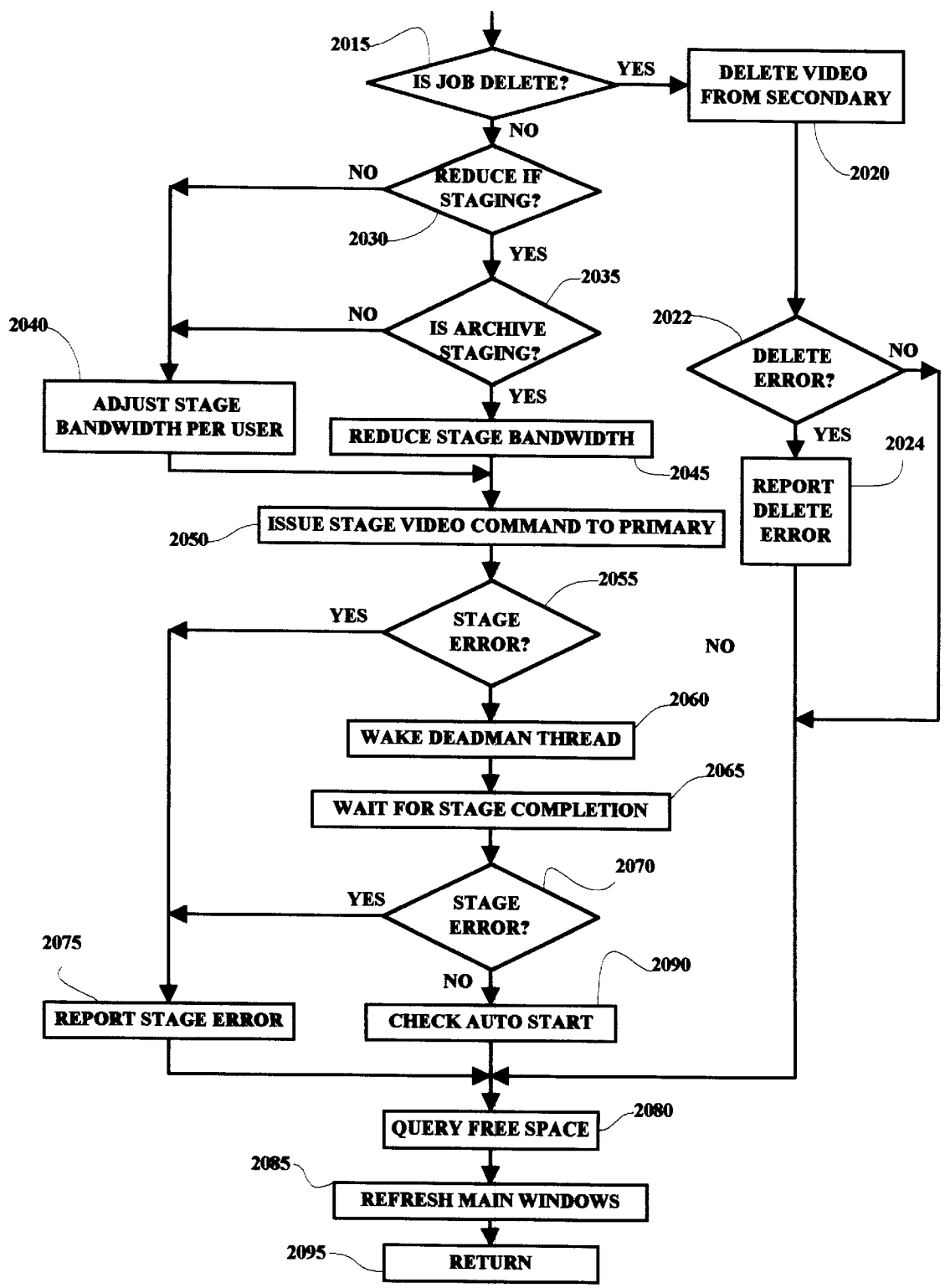
FIG. 20 is a flowchart illustrating the "Process Resync Job" routine.

The Process Resync Job routine, FIG. 20, performs the actual resync work. If the job is a delete request 2015, a delete video command is sent to the secondary video server 2020. If the command failed 2022, the error is reported to the user via the main window video status 2024. Otherwise secondary video server is queried to determine the amount of storage the delete operation freed up 2080 and the main window is refreshed 2085 to reflect the updated free storage amount and to delete the video in the secondary's window because it is no longer extraneous.

If the test at operation 2015 fails, it means the job is a stage event. The user settings are check to see if the user wants the bandwidth reduced if an archive stage is in progress 2030. If not, the stage priority is set according to the user selected default 2040. Else, the servers are queried to determine if an archive stage is currently in progress 2035. If so, the bandwidth is automatically reduced according to the user's setting 2045. If no stage is in progress, the default bandwidth is used 2040. Then the stage command is issued to the primary to send the video to the secondary video server 2050. If the command was rejected 2055, an error is generated and reported 2075. If the command was accepted, the deadman thread is awakened to monitor the stage 2060, and the resync process enters a wait state 2065 until the stage has completed. The resync process will be awakened when the stage completes at which time a test is made to determine the stage disposition. If the stage ended in error 2070, an error is generated and reported 2075. Otherwise, a routine is called to see if the user wants the newly staged video to be automatically started 2090. Whether a stage was successful or failed, the secondary video server is always queried for free space 2080 and the main window is refreshed with the status 2085 (426, 412). The routine then returns to the resync process 2095 to await the next job.

Figure 21:
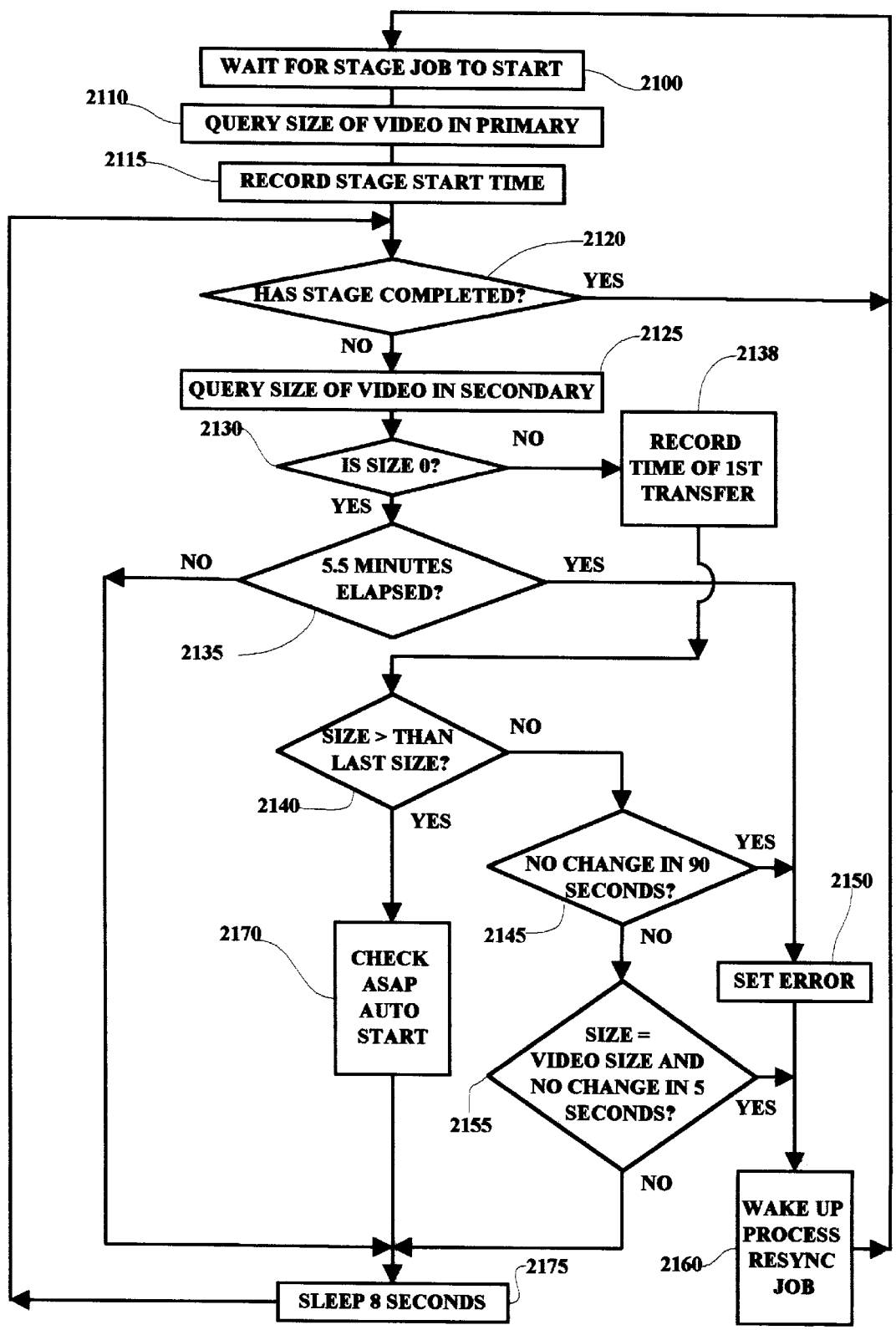
FIG. 21 is a flowchart illustrating the "deadman" thread process which is used to monitor the progress of the stage function.

The purpose of the deadman thread, FIG. 21, is to monitor the progress of the stage. It is possible for the stage to hang or abort or for the stage completion notification to be misrouted. The deadman thread ensures under all conditions that the stage event is properly completed. The deadman thread was created at application startup 730 at which time it entered a wait state 2100 until the start of a stage job. After being awakened by the resync process 2060, the deadman queries the primary for the size of the video that is to be staged 2110. During the stage, the size of the staging video in the secondary will be periodically queried and compared against this value to calculate the progress of the stage.

The deadman then enters a loop 2120–2175 where it wakes up every 8 seconds 2175 and queries the size of the staging video in the secondary video server 2125. The loop continues until the stage has completed 2120 or an error occurs. After reading the size of the video in the secondary 2125, a test is made to see if the staging has started yet 2130. If the stage hasn't begun in 330 seconds 2135, an error is set 2150 and the resync process is awakened 2160 to clean up the job. The deadman then goes back to sleep to await the next stage job 2100. If the size is zero 2130 and less than 330 seconds have elapsed, the deadman goes to sleep for 8 seconds 2175 then reawakens to re-query the size.

Once the stage has begun (i.e. non-zero file size in the secondary), the size is still monitored to ensure the stage job has not hung 2140. If there has been no change in size for 90 seconds 2145, the stage is considered hung and the deadman terminates it by setting an error 2150 and awaking the resync process 2160. If the size has remained the same for less than 90 seconds 2145, the measured size is compared to the actual size of the video in the primary. If the size is equal and the size hasn't changed in 5 seconds 2155, it means the completion notification was lost so the stage is terminated by deadman which awakens the resync process 2160.

Figure 22:
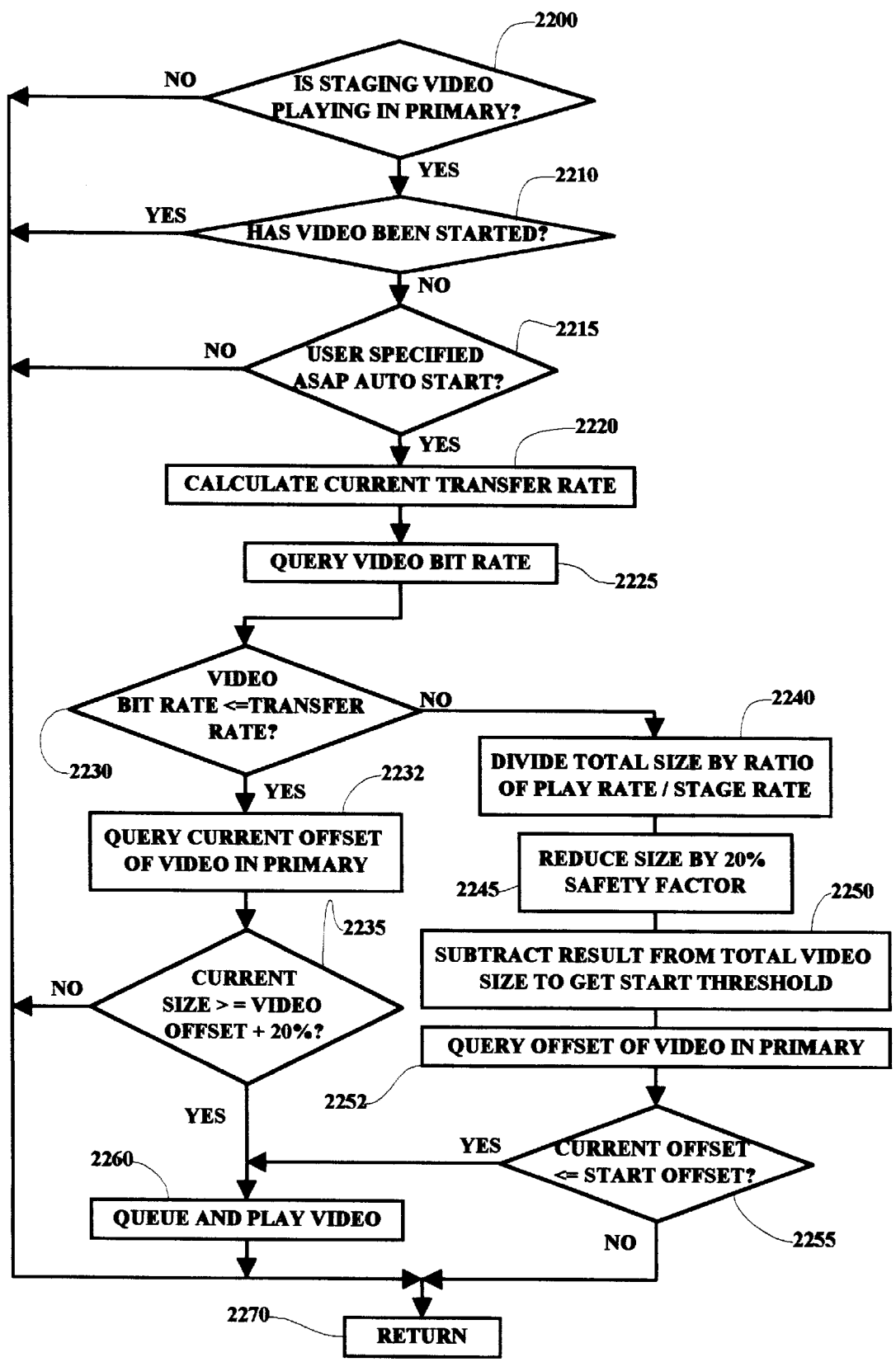
FIG. 22 is a flowchart illustrating the "Check ASAP Auto Start" routine.

While the stage is in progress, the deadman calls the Check ASAP Auto Start routine, FIG. 22, on each invocation 2170 to determine if the video in the secondary should be automatically started. If the video being staged is currently playing or begins to play in the primary server during the stage, the user may elect to have the video automatically started to sync up the streaming of the secondary server with the primary server. This auto synching of the streams is critical if the secondary server is to act as a hot-standby server. The video servers are controlled by master control automation machines 100 that do not have the capability to sync up a video stream with another video server. Therefore, even though the secondary has received the missing video, the stream port remains black until the next video is queued and played which may be more than an hour away.

The routine starts by determining whether the staging video is currently playing in the primary server 2200. If so, and the video hasn't been started yet in the secondary server 2210, a check is made to see if the user has enabled the ASAP auto-start option 2215. If the video isn't playing 2200 or if it has already been started 2210 or the ASAP auto-start hasn't been enabled, the routine immediately returns to the caller 2270. Otherwise the current data transfer rate of the stage (also referred to as the stage rate) is calculated 2220 by dividing the current size of the secondary video obtained in operation 2125 by the elapsed stage time. The elapsed time is specifically calculated as the current time minus the time of the first data transfer recorded at step 2138. This is because in some rare instances, a video may be staged from a tape which has a long access time. The initial delay of loading a tape skews the elapsed time which causes the calculated transfer rate to be artificially low. Another reason to use the time of the first transfer is that the execution of the command may have been delayed.

Once the transfer rate has been calculated 2220, the video bit rate (also referred to as the play rate) is queried 2225 from the video attributes and a test is made to see if the video bit rate is less than or equal to the data transfer rate 2230. If so, it means the video can be played while the stage is in progress as long as enough of the file has thus far been staged. The current play offset of the video is queried at the primary server 2232 and the size of the secondary video obtained in step 2125 is compared to the current play offset plus 20% 2235. The additional 20% was derived empirically and is meant as a safety buffer in case the transfer rate gets reduced due to network perturbations. If the size of the secondary video is greater, the Queue and Play Video routine is called 2260 to start the video in the secondary server at the primary's current offset.

If the transfer rate of the staging video is lower than the video bit rate 2230, then some additional calculations are required to know when the video can be safely started without under-running the video. The methodology takes into account both the transfer rate and the video play rate to ensure that there is always a 20% buffer in the secondary video size to absorb variations in the transfer rate.

Figure 25:
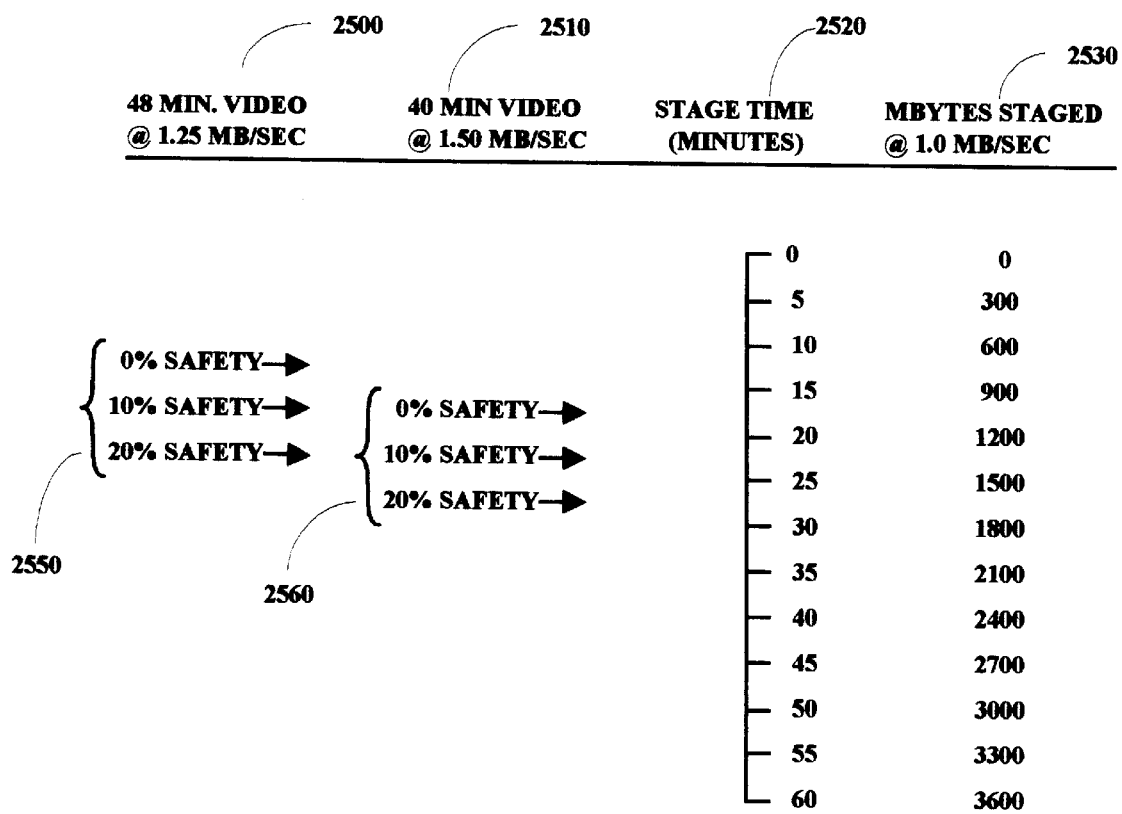
FIG. 25 is a simplified diagrammatic illustration of various stage times in staging an exemplary 3600 MB video.

The actual safety margin used for determining a safe start threshold depends on the transmission characteristics of the network being used to stage videos from the primary to the secondary server. FIG. 25 gives start thresholds for two 3600 MB (megabyte) videos of different play rates, using 0, 10 and 20 percent safety margins. The time line 2520 shows the progression of the stage against the increasing size of the staging video 2530, which is being staged at a rate of 1.0 MB per second. The first video 2500 plays for 48 minutes at a rate of 1.25 MB per second. The start thresholds for that video at safety margins of 0, 10 and 20 percent are 720, 1008 and 1296 MB, respectively. For a video with a play rate of 1.5 MB per second 2510, the start threshold increases to 1200, 1440 and 1680 MB per second. The specific safety margin which should be used is empirically determined.

The total size of the video is divided by the ratio of the play rate to the transfer rate 2240. That size is further reduced by the chosen safety margin of 20% 2245. The start threshold is then obtained by subtracting the size from the total video size 2250. The current play offset of the primary is then queried 2252 and compared to the start threshold 2255.

If the current offset is smaller or equal to the start offset, then enough of the video has been staged into the secondary to safely start the video and the Queue and Play Video routine is called 2260. If the current play offset is greater, then the video can not be started yet and the routine returns 2270. In cases where there is a wide disparity between the transfer rate and the play rate and the primary video starts playing very early in the stage, the secondary will never have enough video data to start playing.

Note that the primary server may have the same video streaming out of more than one port. When the video offset is queried, the video offset of the stream with the latest video start time is used.

Figure 23:
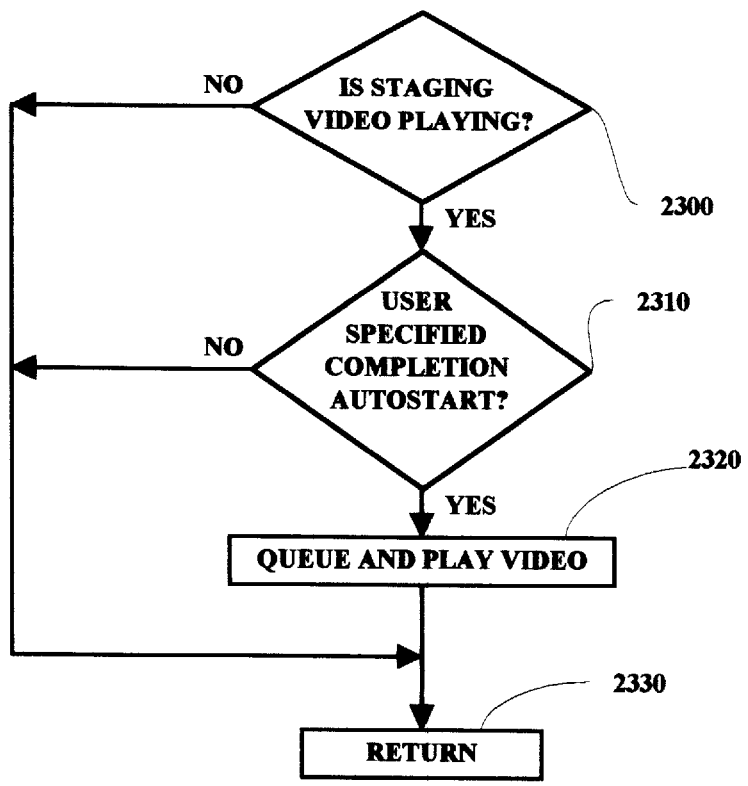
FIG. 23 is a flowchart illustrating the "Check Auto Start" routine.

The Check Auto Start routine, FIG. 23, is called by the process resync job upon successful completion of each stage job 2090. A test is performed to see if the just staged video is currently playing in the primary server 2300. If so, an additional check is made to determine if the auto-start feature was enabled 2310. If enabled, the Queue and Play Video routine is called to start up the video at the correct play offset.

Figure 24:
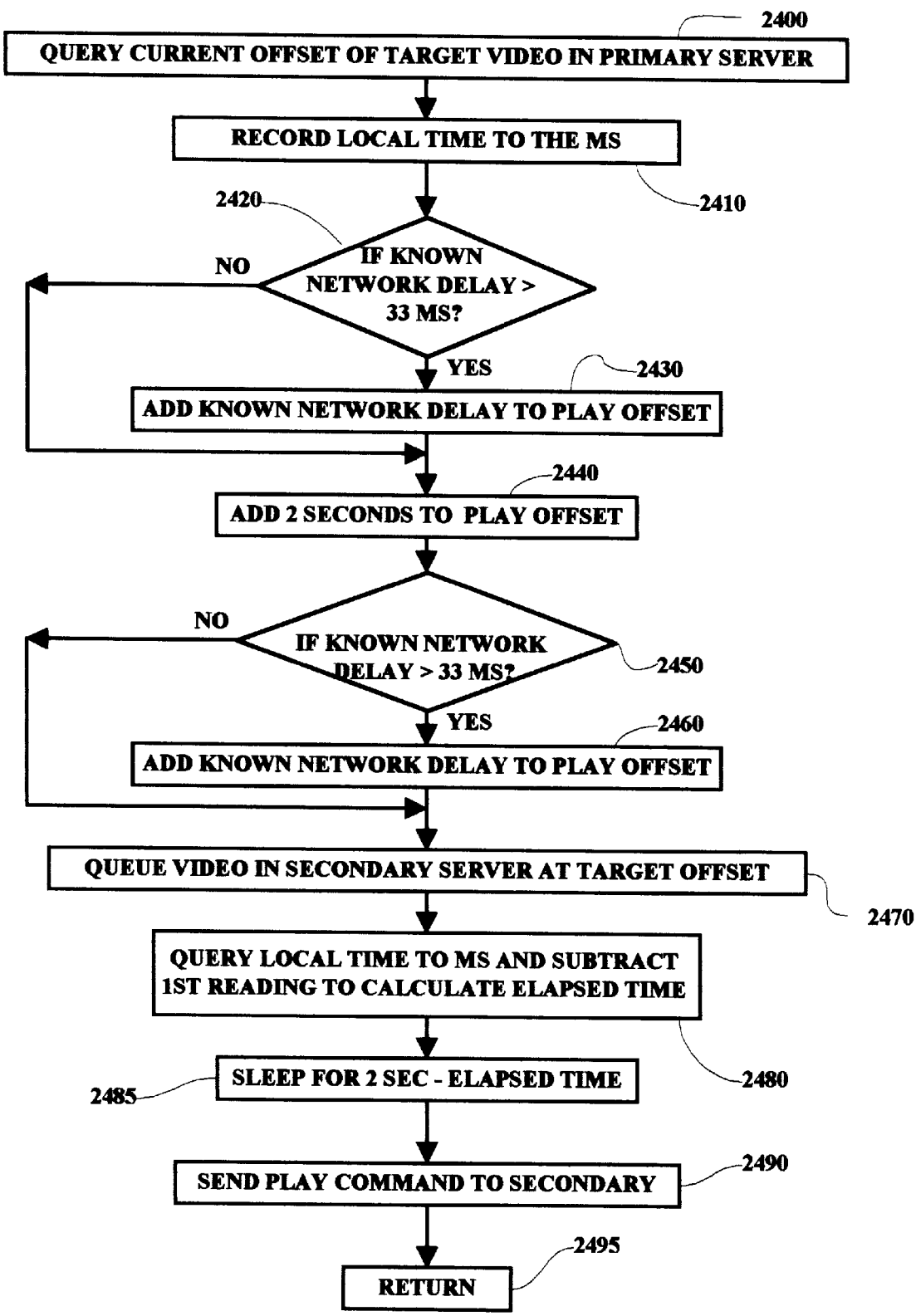
FIG. 24 is a flow chart illustrating the "Queue and Play Video" routine.

The Queue and Play Video routine, FIG. 24, queues up a video in the secondary video server at some predetermined offset and then commands the server to play it at the precise moment such that the stream is in sync with it's counterpart in the primary server. The accuracy of the synchronization is plus or minus 1 video frame or 33 milliseconds once the network delays is empirically derived from measurements. Video servers are generally on small, private networks which keeps the variation in network delay to within one frame time.

The routine begins by querying the latest current play offset of all streams playing the target video 2400. The local time is then immediately recorded with the resolution of a millisecond 2410. If the known, one way trip network delay is greater than 33 milliseconds 2420, it is added to the play offset 2430 to account for the response time in 2400. An additional 2 seconds is added to the offset 2440 because there may be a delay when queuing the video. Again the network delay is added 2460 to account for the transmit time of the play command. The queued command is then issued 2470 to the secondary video server to queue the video at the target play offset. The local time is again read 2480 and is subtracted from the first reading to determine how much time elapsed performing operations 2420 through 2470. The routine then requests to sleep for a period of time equal to 2 seconds minus the elapsed time 2485. When awakened, the play command is immediately issued to the secondary video server 2490. In this manner the play offset of the video in the secondary is precisely aligned with the streaming video in the primary server. The routine then returns 2495.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The methodology may also be implemented solely in program code stored on a CD, disk or diskette (portable or fixed), or other memory or storage device, from which it may be executed to function as described herein. Further, although the exemplary embodiment has been illustrated in connection with a broadcast station, it will be appreciated that the video output may also be applied in a closed system or network such as a hotel or corporate network. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for operating a video station, said method comprising:

operating a first video server to provide a first server output stream;

operating a second video server to provide a second server output stream, said first and second server output streams comprising content files for presentation on display devices;

synchronizing the content files of said second video server with the content files of said first video server such that the content files of both said first and second video servers are substantially identical;

controlling said first and second video servers with a master control server, said master control server being selectively operable to enable said first video server to supply an output from said video station, said second video server being operable to serve as a back-up server to selectively supply said output from said video station instead of said first video server, said video station further including a video content archive coupled to said first and second video servers, said first and second video servers being arranged to selectively load video content files from said video archive; and querying whether at least one of said first and second video servers has a selected video content file available in a memory of said one server, said one of said first and second video servers being responsive to said querying for providing a video content file present signal representative of whether said selected video content file is present in memory of said one of said first and second video servers.

2. The method as set forth in claim 1 wherein said video station is a broadcast station, said video station being selectively operable for broadcasting a selected one of said first and second server output streams to air.

3. The method as set forth in claim 1 wherein said video station is a network server station in a network, said network server station being selectively operable for providing a selected one of said first and second server output streams to said network.

4. The method as set forth in claim 1 and further including:

re-synchronizing the content of said second server with the content of said first server if the content of said second server becomes out of synchronization with said content of said first server.

5. The method as set forth in claim 4 wherein said video station is a broadcast station, said video station being selectively operable for broadcasting a selected one of said first and second server output streams to air.

6. The method as set forth in claim 4 wherein said video station is a network server station in a network, said network server station being selectively operable for providing a selected one of said first and second server output streams to said network.

7. The method as set forth in claim 1 wherein said master control server is further selectively operable for:

effecting a playing of said selected video content file if said selected video content file is present in memory of said one video server.

8. The method as set forth in claim 7 wherein said master control server is further selectively operable for:

sending a queue command to said one video server if said selected video content file is not present in memory of said one video server, said one video server being responsive to said queue command for retrieving said selected video content file from said archive to memory in said one video server.

9. The method as set forth in claim 8 wherein said master control server is further selectively operable when a queried video file is not present in memory of said one video server for:

determining if said one video server has sufficient memory available to load said selected video content file, said control server being further operable for effecting a deletion of an unnecessary video file from memory of said one video server in order to make sufficient memory space available for said selected video file.

10. The method as set forth in claim 9 wherein said master control server is further operable to designate a queued video file to be played following a playing of a current video file in accordance with a first server playlist.

11. The method as set forth in claim 10 wherein said master control server is further operable to designate a staged video file to be played following a queued video file in accordance with a first server playlist.

12. The method as set forth in claim 4 wherein said re-synchronizing is managed by a resync manager device, said resync manager device being coupled to said first and second video servers.

13. A method for operating a video station, said method comprising:

operating a first video server to provide a first server output stream;

operating a second video server to provide a second server output stream, said first and second server output streams comprising content files for presentation on display devices;

synchronizing the content files of said second video server with the content files of said first video server such that the content files of both said first and second video servers are substantially identical; and re-synchronizing the content of said second server with the content of said first server if the content of said second server becomes out of synchronization with said content of said first server; and selectively designating a priority for said content files being re-synchronized, said priority being related to a transfer rate to be used in transferring video content files to said video server being re-synchronized.

14. The method as set forth in claim 13 wherein said re-synchronizing further includes:
    selectively designating a priority bandwidth to be used in transferring video content files to said video server being re-synchronized.

15. The method as set forth in claim 14 wherein said re-synchronizing is accomplished by an operator selecting from at least one operational display screen presented on said master control server.

16. The method as set forth in claim 15 and further including:
    selectively designating a priority for said content files being re-synchronized, said priority being related to a transfer rate to be used in transferring video content files to said video server being re-synchronized.

17. The method as set forth in claim 16 wherein said re-synchronizing further includes:
    selectively designating a priority bandwidth to be used in transferring video content files to said video server being re-synchronized.

18. The method as set forth in claim 15 wherein said re-synchronizing is accomplished manually by said operator for at least one content file on said server being re-synchronized.

19. The method as set forth in claim 14 wherein synchronization is accomplished automatically after said video file content of said second video server becomes unsynchronized with said video file content of said first video server.

20. An information processing system comprising:
    a first video server arranged to selectively output a first data stream comprised of a first series of content files;
    a second video server coupled to said first video server, said second video server being arranged to selectively output a second data stream comprised of a second series of content files;
    a video output device coupled to said first and second video servers, said video output device being selectively operable for outputting a selected one of said first and second content files;
    a control device coupled to said first and second video servers, said control device being selectively operable for synchronizing said first and second content files such that said first and second content files are substantially identical, said control device being further selectively operable for controlling said first and second video servers to enable said first video server to supply an output from said video station, said second video server being operable to serve as a back-up server to selectively supply said output from said video station instead of said first video server, said video station further including a video content archive coupled to said first and second video servers, said first and second video servers being arranged to selectively load video content files from said video archive; and
    querying whether at least one of said first and second video servers has a selected video content file available in a memory of said one server, said one of said first and second video servers being responsive to said querying for providing a video content file present signal representative of whether said selected video content file is present in memory of said one of said first and second video servers.

21. The information processing system as set forth in claim 20 wherein said control device is further selectively operable to effect a synchronization of said first and second content files in the event said first and second content files become unsynchronized.

22. The information processing system as set forth in claim 21 wherein said first video server is a primary server for outputting said first data stream to said video output device, said second video server being arranged to operate in a stand-by mode to selectively provide said second data stream to said video output device in place of said first data stream.

23. The information processing system as set forth in claim 22 and further including operator selection means coupled to said control device, said operator selection means being arranged to enable an operator to control said synchronization.

24. The information processing system as set forth in claim 22 and further including selection means wherein said synchronization is accomplished automatically.

25. The information processing system as set forth in claim 20 wherein said video output device is arranged for providing a single video output stream for broadcast to air.

26. The information processing system as set forth in claim 20 wherein said video output device is arranged for providing a single video output stream for distribution to network system.

27. The information processing system as set forth in claim 21 wherein said video output device is arranged for providing a single video output stream for broadcast to air.

28. The information processing system as set forth in claim 21 wherein said video output device is arranged for providing a single video output stream for distribution to network system.

29. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being useful in operating a video station, said program signals being effective for:
    operating a first video server to provide a first server output stream;
    operating a second video server to provide a second server output stream, said first and second server output streams comprising content files for presentation on display devices;
    synchronizing the content files of said second video server with the content files of said first video server such that the content files of both said first and second video servers are substantially identical;
    controlling said first and second video servers with a master control server, said master control server being selectively operable to enable said first video server to supply an output from said video station, said second video server being operable to serve as a back-up server to selectively supply said output from said video station instead of said first video server, said video station further including a video content archive coupled to said first and second video servers, said first and second video servers being arranged to selectively load video content files from said video archive; and
    querying whether at least one of said first and second video servers has a selected video content file available in a memory of said one server, said one of said first and second video servers being responsive to said querying for providing a video content file present signal representative of whether said selected video content file is present in memory of said one of said first and second video servers.

30. The medium as set forth in claim 29 wherein said video station is a broadcast station, said video station being selectively operable for broadcasting a selected one of said first and second server output streams to air.

31. The medium as set forth in claim 29 wherein said video station is a network server station in a network, said network server station being selectively operable for providing a selected one of said first and second server output streams to said network.

32. The medium as set forth in claim 29 wherein said program signals are further effective for:

re-synchronizing the content of said second server with the content of said first server if the content of said second server becomes out of synchronization with said content of said first server.

33. The medium as set forth in claim 32 wherein said video station is a broadcast station, said video station being selectively operable for broadcasting a selected one of said first and second server output streams to air.

34. The medium as set forth in claim 32 wherein said video station is a network server station in a network, said network server station being selectively operable for providing a selected one of said first and second server output streams to said network.

35. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective for:

operating a first video server to provide a first server output stream;

operating a second video server to provide a second server output stream, said first and second server output streams comprising content files for presentation on display devices; and synchronizing the content files of said second video server with the content files of said first video server such that the content files of both said first and second video servers are substantially identical;

re-synchronizing the content of said second server with the content of said first server if the content of said second server becomes out of synchronization with said content of said first server; and selectively designating a priority for said content files being re-synchronized, said priority being related to a transfer rate to be used in transferring video content files to said video server being re-synchronized.

36. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective for:

operating a first video server to provide a first server output stream;

operating a second video server to provide a second server output stream, said first and second server output streams comprising content files for presentation on display devices; and synchronizing the content files of said second video server with the content files of said first video server such that the content files of both said first and second video servers are substantially identical;

re-synchronizing the content of said second server with the content of said first server if the content of said second server becomes out of synchronization with said content of said first server; and selectively designating a priority bandwidth to be used in transferring video content files to said video server being re-synchronized.

37. The medium as set forth in claim 32 wherein said re-synchronizing is accomplished by an operator selecting from at least one operational display screen presented on said master control server.

* * * * *